United States Patent
Burton

(10) Patent No.: US 10,518,697 B2
(45) Date of Patent: Dec. 31, 2019

(54) LOBED INPUT SHAFT ADJUSTER

(71) Applicant: Burton Technologies, LLC, Ludington, MI (US)

(72) Inventor: John E. Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

(21) Appl. No.: 16/051,640

(22) Filed: Aug. 1, 2018

(65) Prior Publication Data

US 2019/0039506 A1 Feb. 7, 2019

Related U.S. Application Data

(60) Provisional application No. 62/539,846, filed on Aug. 1, 2017.

(51) Int. Cl.
| | | |
|---|---|---|
| *F16H 27/02* | (2006.01) | |
| *F16H 29/02* | (2006.01) | |
| *B60Q 1/068* | (2006.01) | |

(52) U.S. Cl.
CPC ........ *B60Q 1/0683* (2013.01); *B60Q 2200/32* (2013.01)

(58) Field of Classification Search
CPC ............................. B60Q 1/0683; B60Q 1/0686
See application file for complete search history.

(56) References Cited

U.S. PATENT DOCUMENTS

| | | | |
|---|---|---|---|
| 6,042,254 A | 3/2000 | Burton | |
| 6,257,747 B1 | 7/2001 | Burton | |
| 6,619,809 B2* | 9/2003 | Chiang | B60Q 1/0683 362/273 |
| 6,773,153 B2 | 8/2004 | Burton | |
| 7,118,259 B2* | 10/2006 | Fladhammer | B60Q 1/0683 362/515 |
| 7,303,321 B2* | 12/2007 | Miller | B60Q 1/0683 362/428 |
| 7,762,686 B2* | 7/2010 | Fladhammer | B60Q 1/0683 362/273 |
| 10,023,101 B2* | 7/2018 | Burton | B60Q 1/0683 |

OTHER PUBLICATIONS

International Search Report dated Oct. 23, 2018 for PCT Application No. PCT/US2018/044755.

* cited by examiner

*Primary Examiner* — Jake Cook
(74) *Attorney, Agent, or Firm* — James Joyce; Godfrey & Kahn, S.C.

(57) ABSTRACT

An adjuster mechanism includes a housing having a neck and an adjustment shaft extending from the housing. The adjustment shaft is engageable in a reflector of a headlamp. An input shaft extends through the neck of the housing and rotation thereof causes movement of the adjustment shaft. At least one lobe is situated on the input shaft so as to create a non-circular interference fit that establishes a resistance to rotation of the input shaft.

10 Claims, 34 Drawing Sheets

LOBED INPUT SHAFT ADJUSTER

FIELD OF THE INVENTION

This invention relates generally to adjuster mechanisms and in particular to a headlamp adjuster mechanism for use in motor vehicles.

BACKGROUND

As the design of vehicles, automobiles and small trucks in particular, has evolved, headlights have continually been reconfigured to improve the aerodynamics of the front end of the vehicle. Modern headlights are designed so that their lenses follow the contour of the vehicle to provide an aerodynamically efficient exterior surface. However, adjustment of these headlights must still be performed in order to provide an optimal beam of light and to prevent the aiming of light beams toward oncoming vehicles. Automotive manufacturers' demand for aerodynamically efficient headlight designs has led to modular designs requiring the headlight adjustment mechanism to be located within the interior of the engine compartment so that adjustment can be easily performed without removing any trim pieces. Thus, the constraints of the installation area and the demands of the automobile manufacturers for aerodynamic headlight designs dictate that an adjuster for use with the aerodynamic designs be adjustable from inside the engine compartment using ordinary tools, and must be able to translate rotational motion of the adjusting part into linear motion of the adjusting means that adjusts the lamp within the headlight assembly. There are many devices incorporating such designs including, among others, the devices disclosed in U.S. Pat. Nos. 5,707,133; 5,214,971; and 6,257,747 to Burton, the inventor of the present invention, the disclosures of which are incorporated herein by reference.

Automotive lamp assemblies used as headlights typically include several basic parts: a support frame, a reflector, a lens, a bulb, and one or more adjusters. The support frame either completely houses the reflector and the bulb on a pivotable mounting to allow the aim of the light to be adjusted using the adjusters or provides a mounting surface for attaching a headlamp adjuster. The lens seals the front of either the support frame or directly to the reflector to protect it from the elements assailing the front end of the vehicle and provides an aerodynamic shape and attractive appearance. The reflector mounts on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Right angle style adjusters, such as the ones disclosed in some of the Burton patents referenced above, are often used to allow the adjustment of the headlight from an adjusting position above the installed headlight. In other applications, motorized adjusters, straight adjusters, or other types of adjuster are used. In addition to the adjustability of the lamp assemblies, due to the significant amount of vibration experienced during operation of the vehicle, it is important for the adjuster to retain its set position.

SUMMARY OF THE INVENTION

As illustrated by the following description and shown in the Figures, the present invention is more suitable as a headlamp adjuster than are conventional adjusters. The present invention overcomes certain of the limitations and disadvantages of existing adjusters, at least by utilizing an effective design wherein rotation resistance and rotational securement can be selectively controlled using various input shaft and housing materials and configurations.

In at least some embodiments, an adjuster mechanism is provided that includes a housing having a neck; an adjustment shaft extending from the housing, the adjustment shaft engageable in a reflector of a headlamp; an input shaft extending through the neck of the housing, the input shaft rotatable to cause movement of the adjustment shaft; and at least one lobe situated on the input shaft, wherein the at least one lobe provides a non-circular interference fit that establishes a resistance to rotation of the input shaft sufficient to retain the adjustment shaft extending from the housing in a desired adjustment.

In at least some other embodiments, an adjuster mechanism is provided that includes a housing having a cylindrical neck; an adjustment shaft extending from the housing, the adjustment shaft engageable in a reflector of a headlamp; a drive gear having an input shaft extending through the neck of the housing, the input shaft rotatable to cause movement of the adjustment shaft via a splined engagement; and a plurality of lobes situated on the input shaft, wherein the at least one lobe provides a non-circular interference fit that reshapes a wall portion of the cylindrical neck to establish a resistance to rotation of the input shaft sufficient to retain the adjustment shaft extending from the housing in a desired adjustment.

BRIEF DESCRIPTION OF THE DRAWINGS

Embodiments of the adjuster are disclosed with reference to the accompanying drawings and are for illustrative purposes only. The adjuster is not limited in its application to the details of construction or the arrangement of the components illustrated in the drawings. The adjuster is capable of other embodiments or of being practiced or carried out in other various ways. In the drawings.

DETAILED DESCRIPTION

Figure 1A:
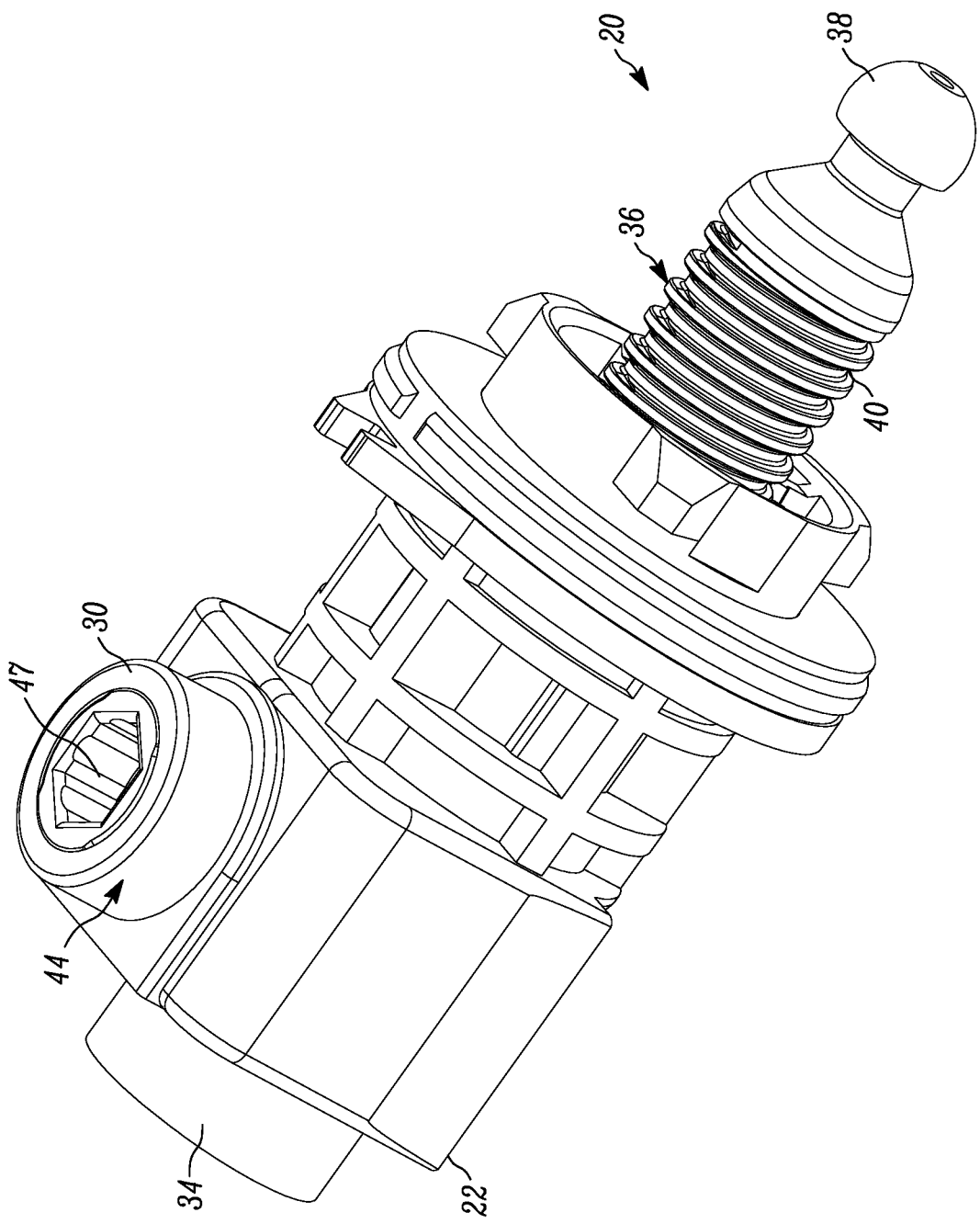
FIG. 1A is a top side perspective view of an exemplary embodiment of an adjuster comprising a housing, a drive gear, adjustment gear, and an adjustment shaft.
Figure 1B:
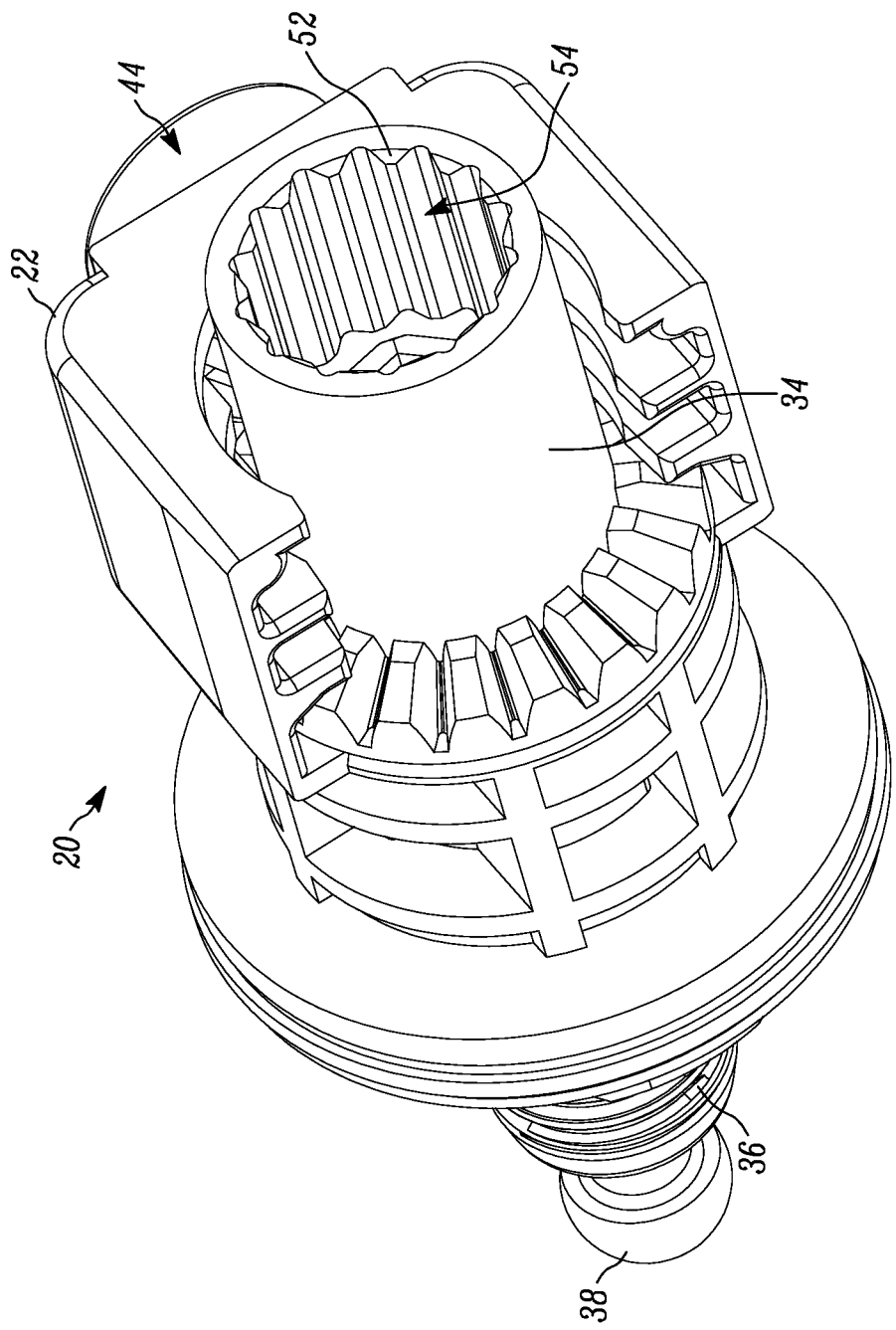
FIG. 1B is a bottom perspective view of the adjuster of FIG. 1A.
Figure 1C:
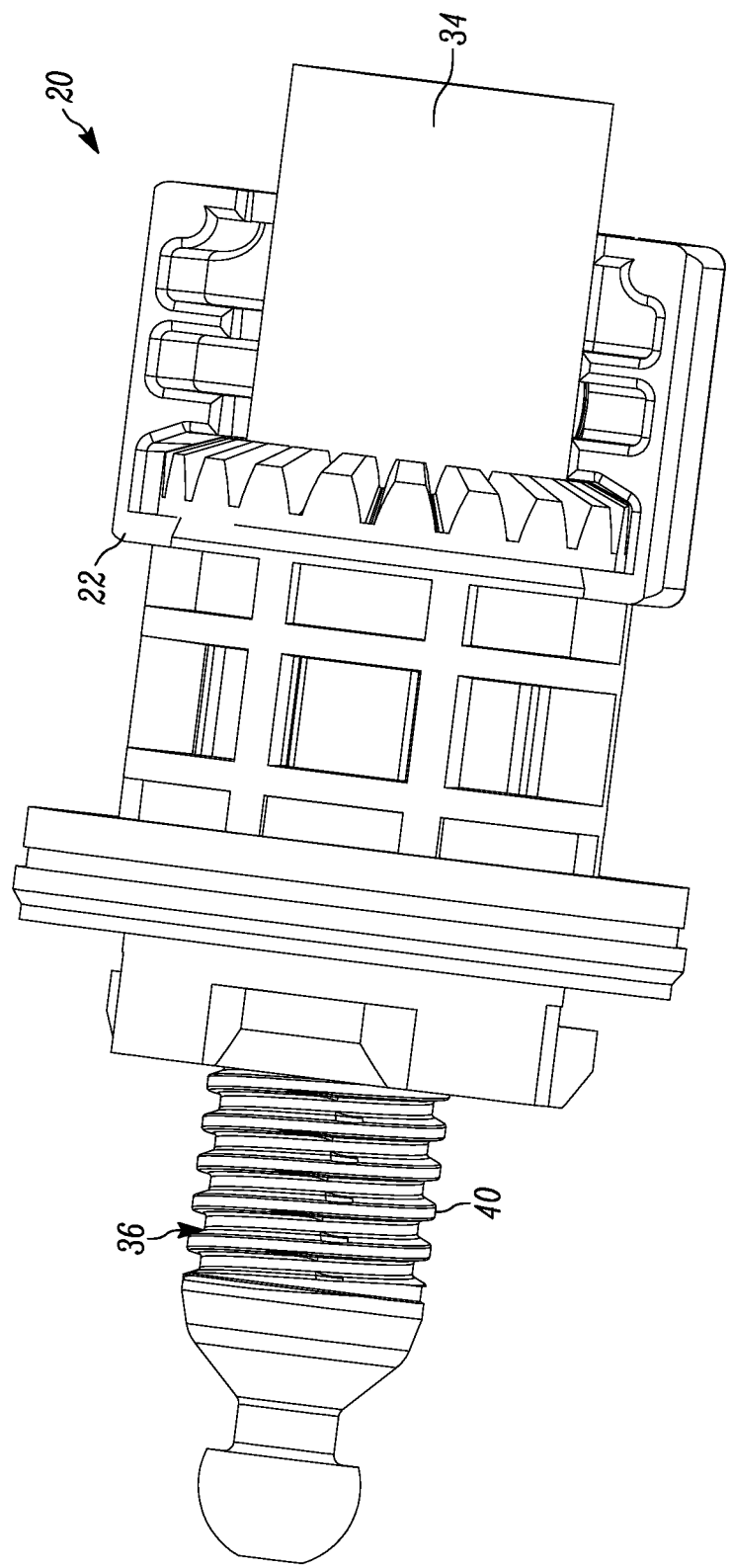
FIG. 1C is a bottom view of the adjuster of FIG. 1A.
Figure 2:
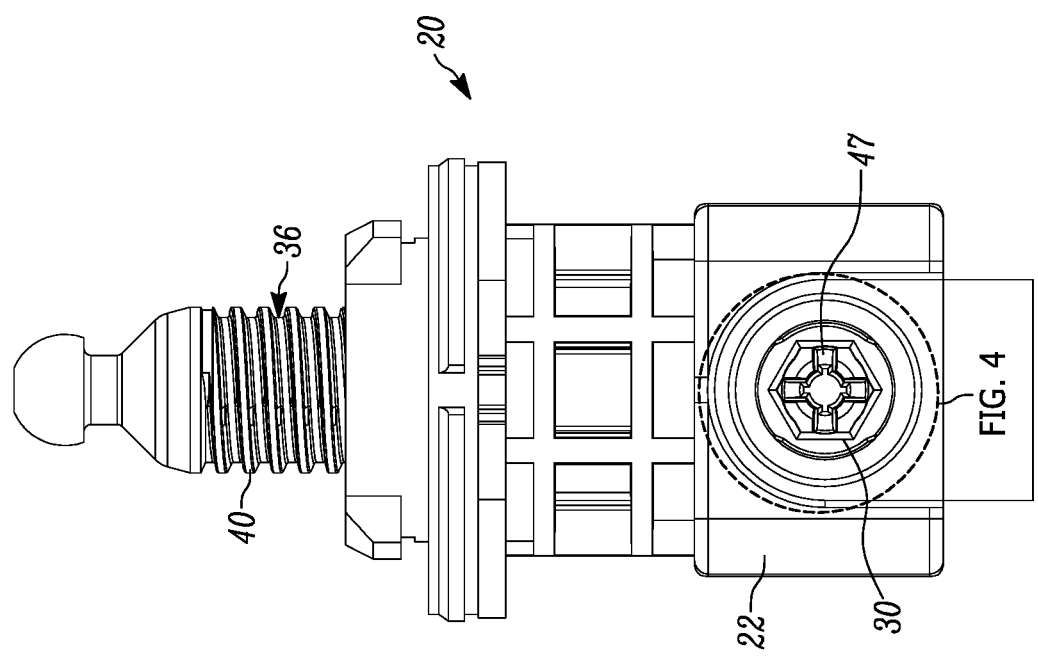
FIG. 2 is a top view of the adjuster of FIG. 1A.
Figure 3:
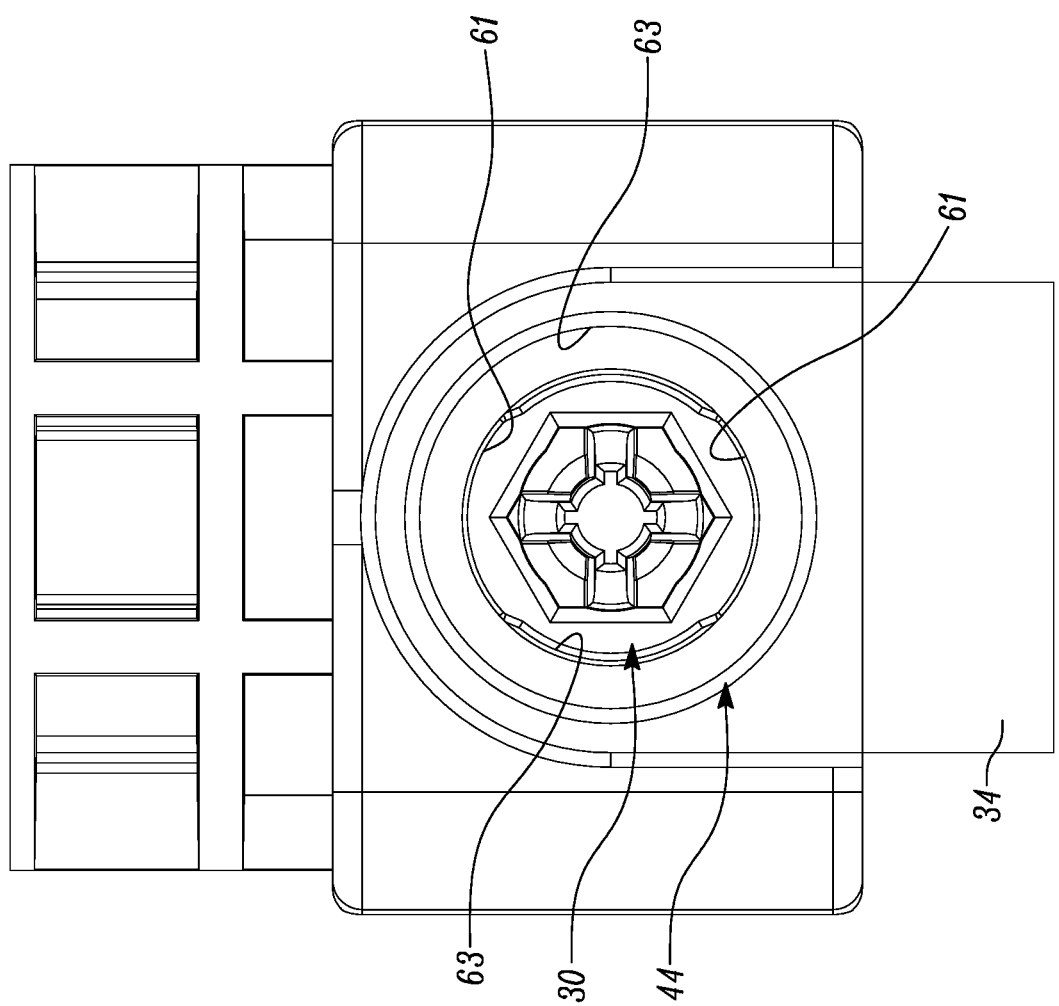
FIG. 3 is a detail top view of a portion of the adjuster of FIG. 2.
Figure 4:
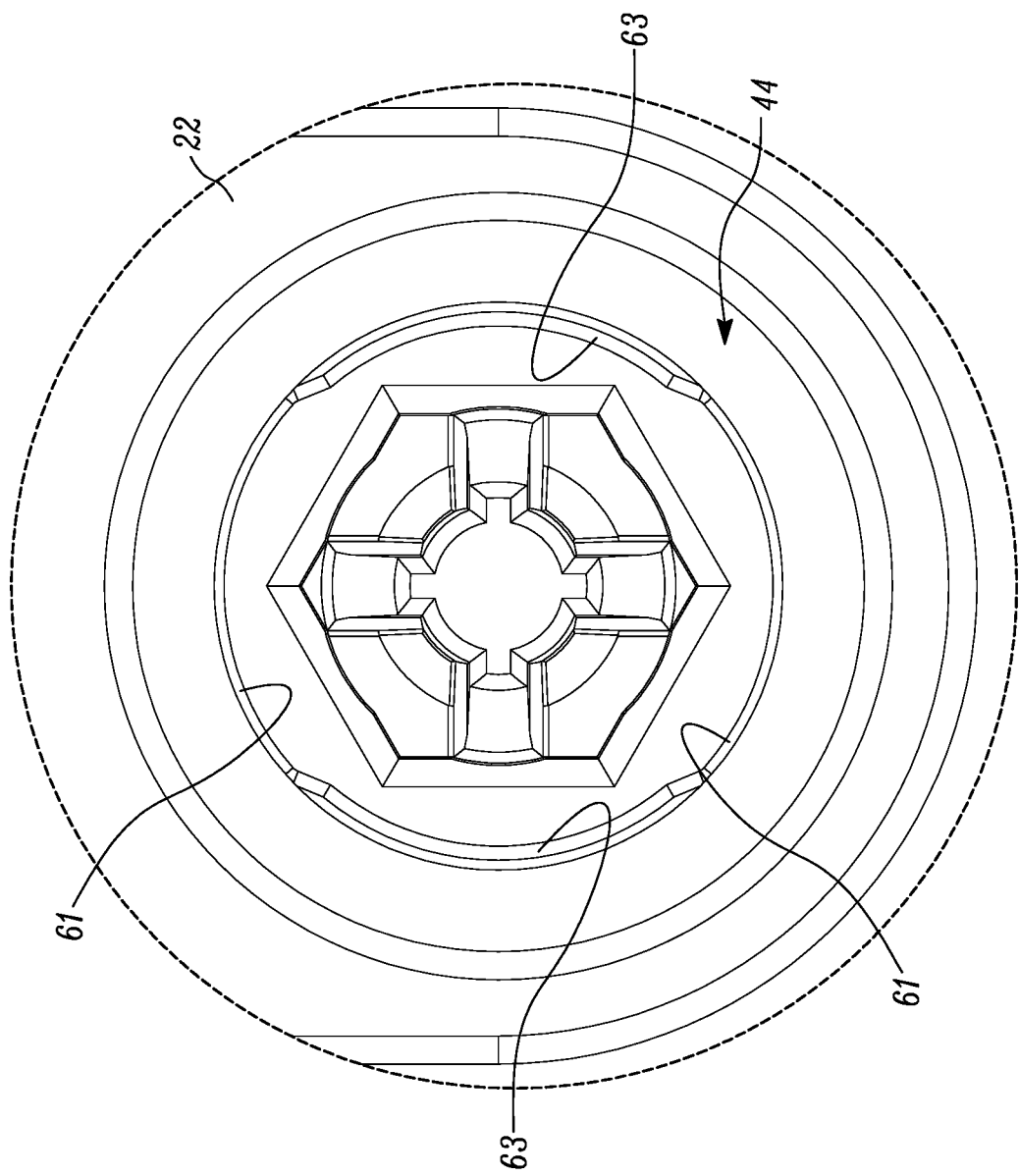
FIG. 4 is a detail top view of a portion of the adjuster of FIG. 3.
Figure 5:
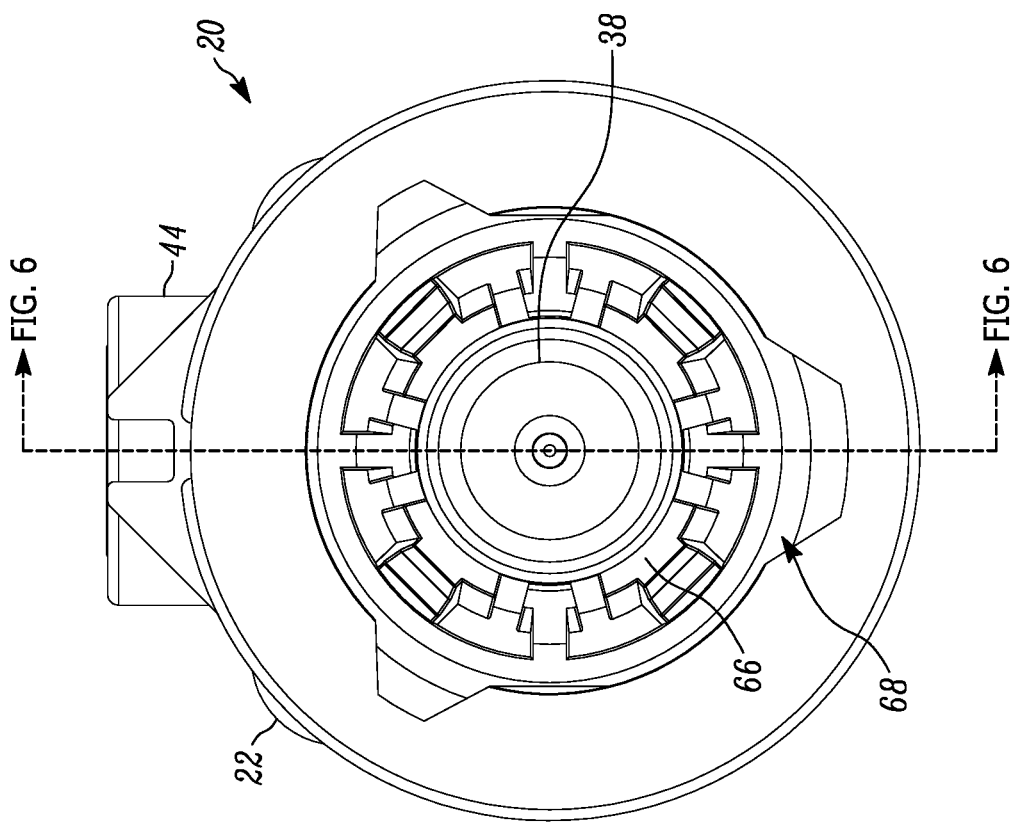
FIG. 5 is a front view of the adjuster of FIG. 1A.
Figure 6:
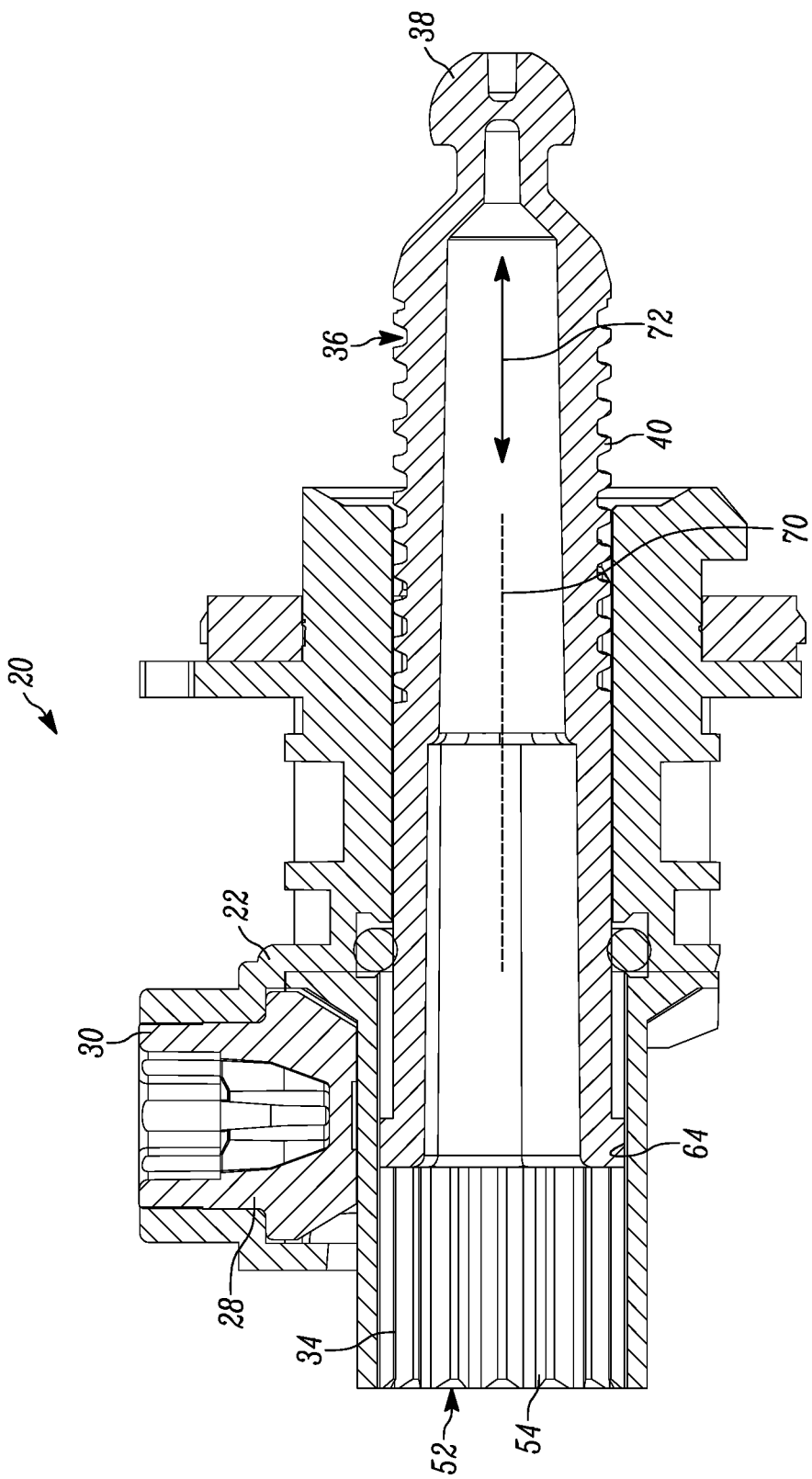
FIG. 6 is a cross-section of the adjuster of FIG. 5, taken generally along the line A-A in FIG. 5.
Figure 7:
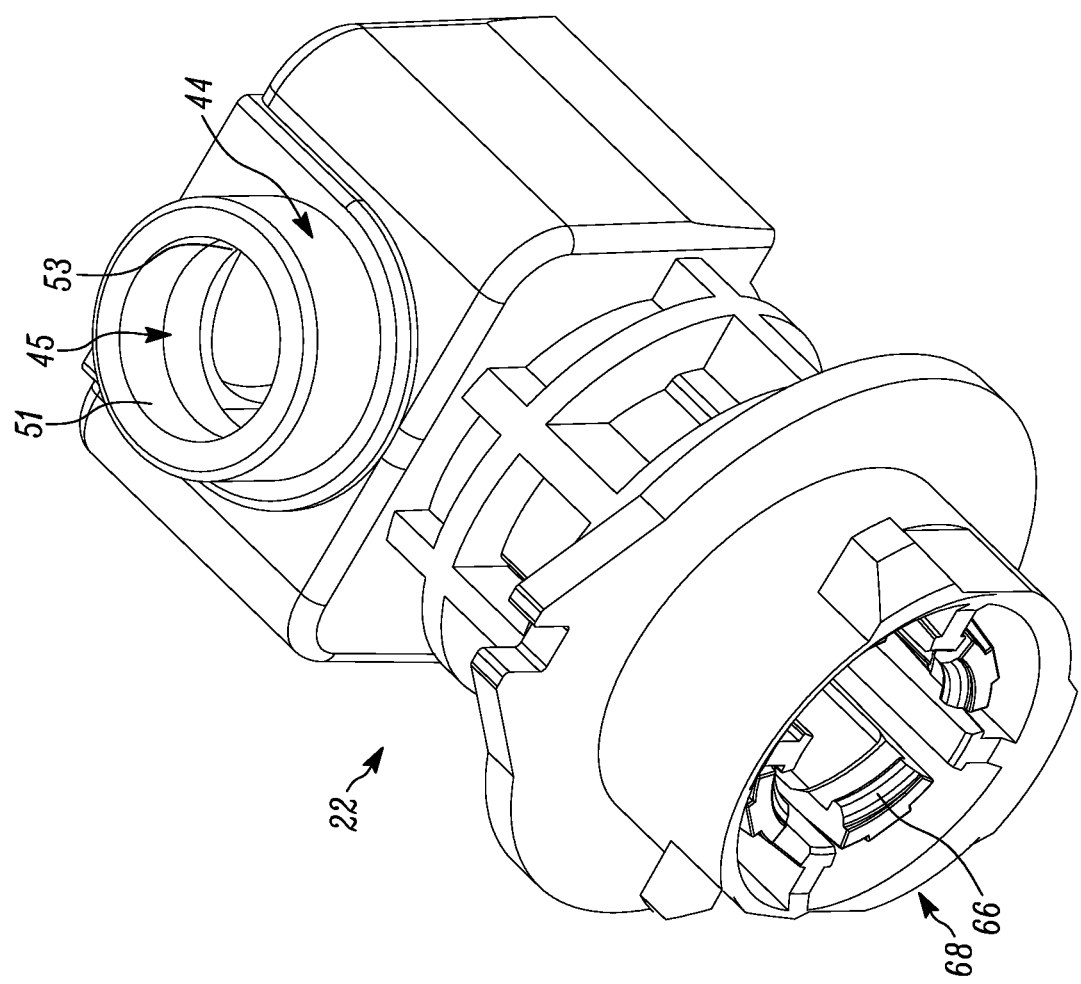
FIG. 7 is a top side perspective view of the housing of the adjuster of FIG. 1A.
Figure 8:
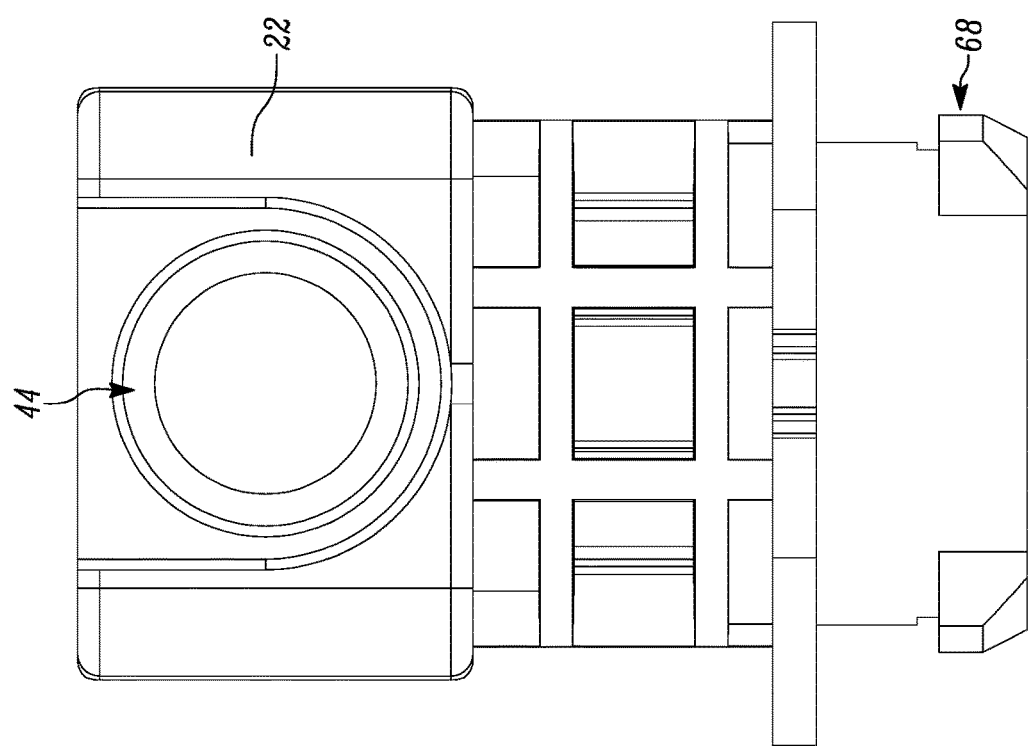
FIG. 8 is a top view of the housing of the adjuster of FIG. 1A.
Figure 9:
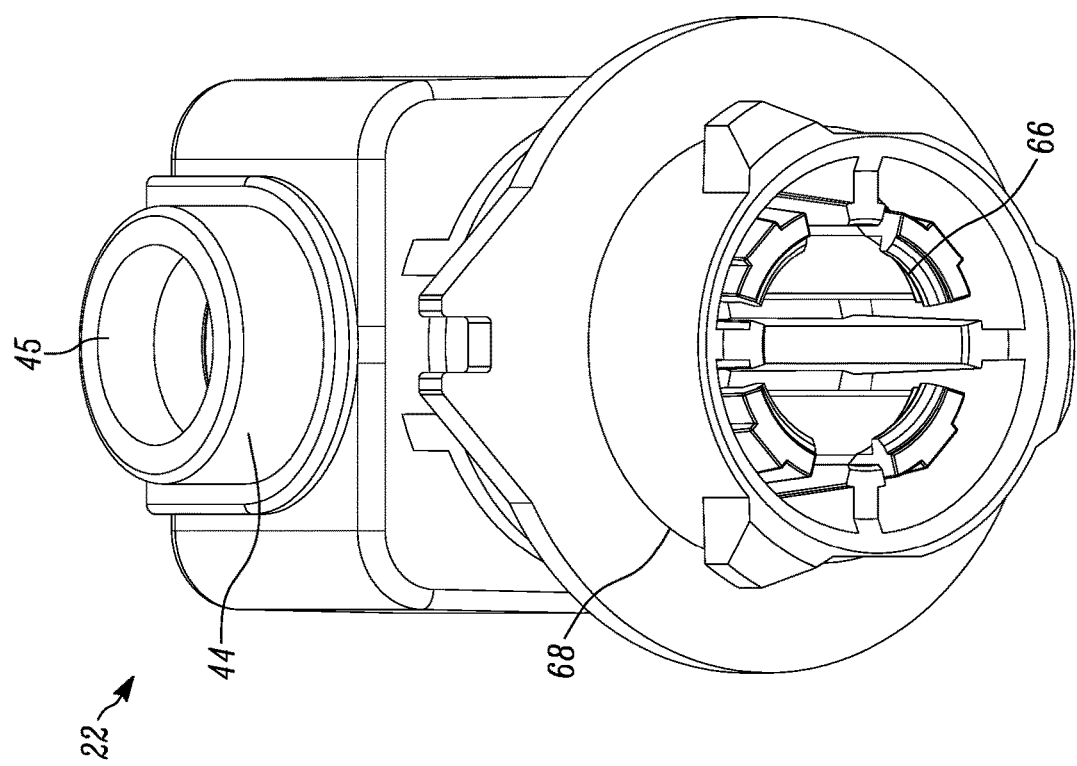
FIG. 9 is a top front perspective view of the housing of the adjuster of FIG. 1A.
Figure 10:
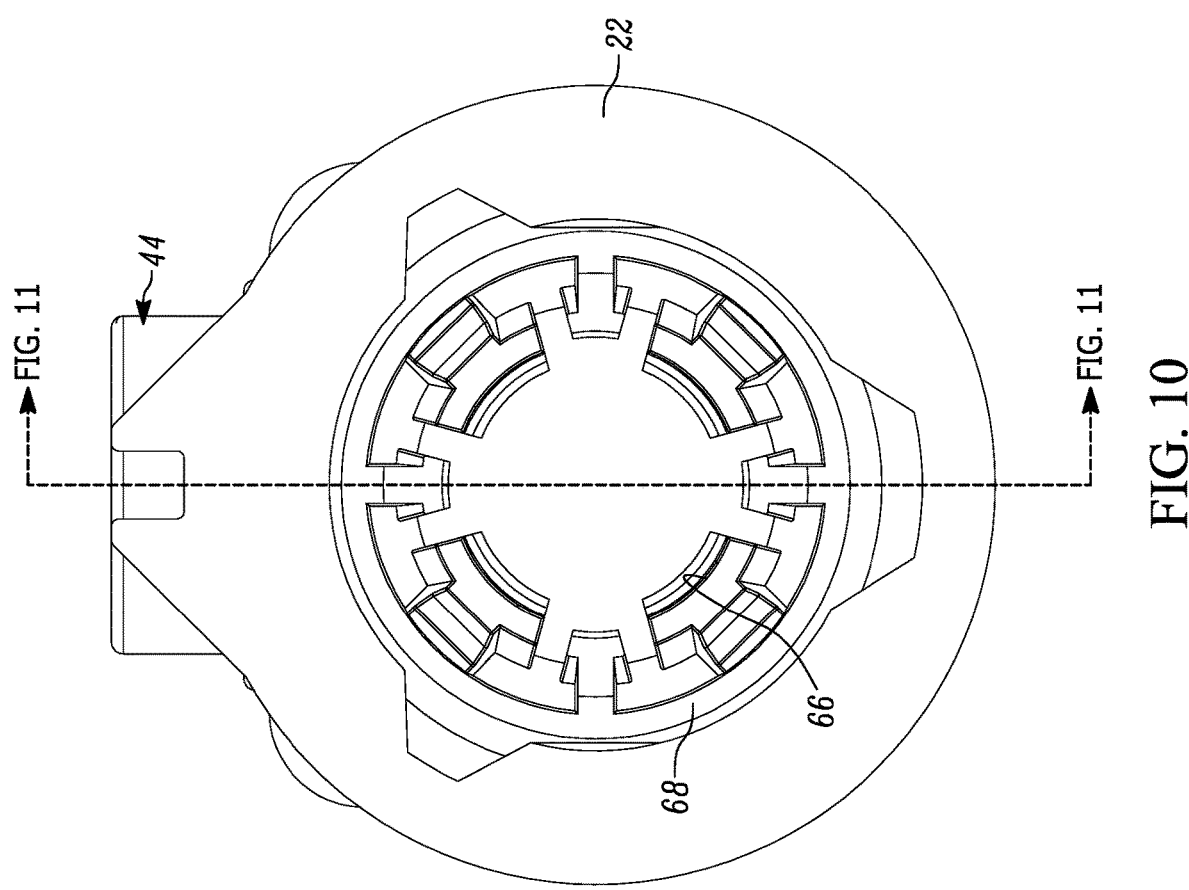
FIG. 10 is a front view of the housing of the adjuster of FIG. 1A.
Figures 11, 12:
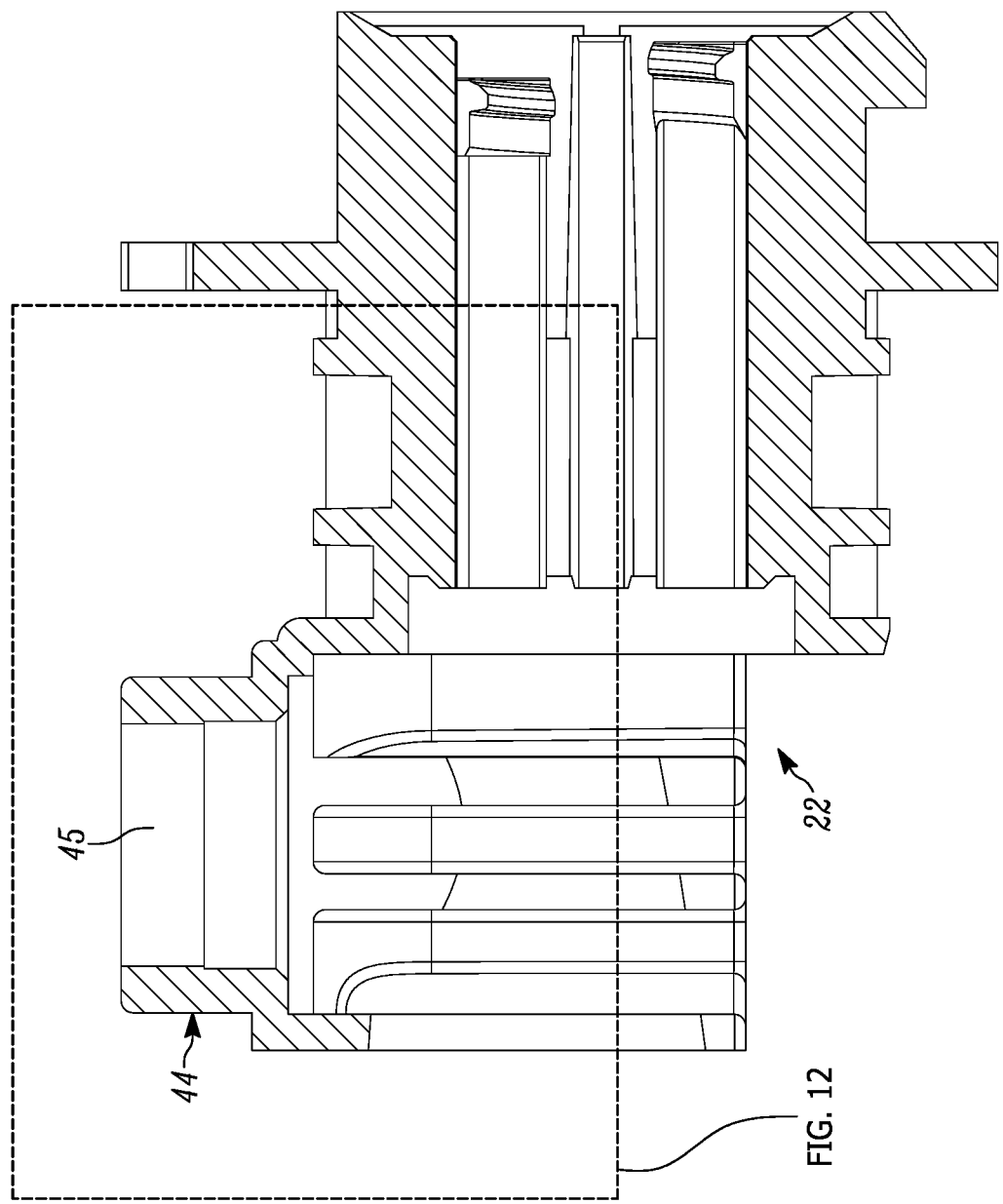
FIG. 11 is a cross-section of the housing of the adjuster of FIG. 10, taken generally along the line B-B in FIG. 10
FIG. 12 is a detail view of a portion of the cross-section of the housing of FIG. 11.
Figure 12:
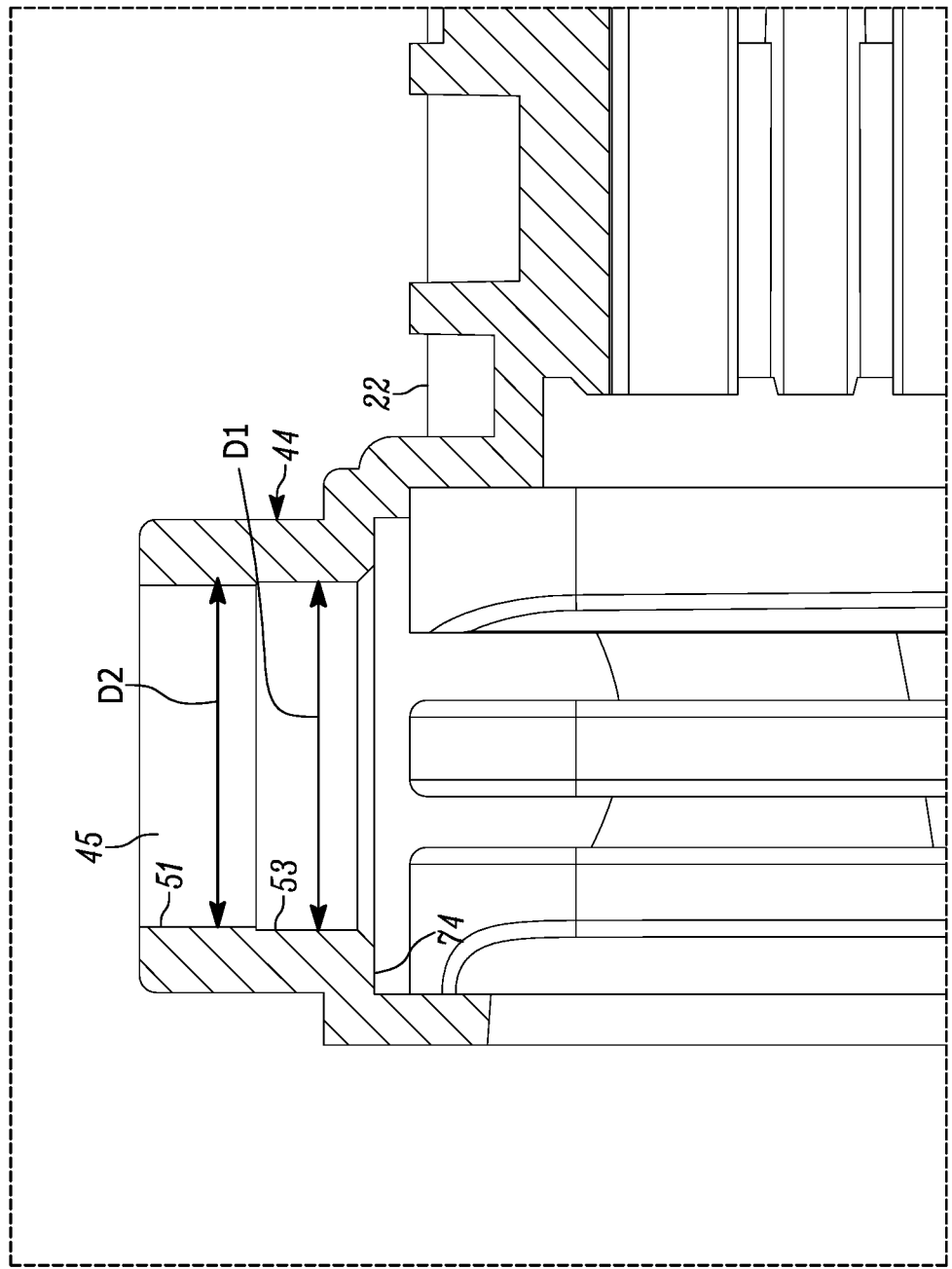
Figure 13A:
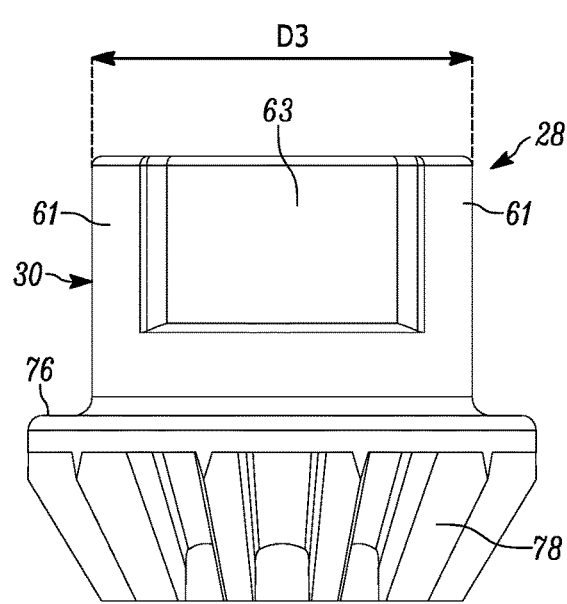
FIGS. 13A-13D are front, side, top, and perspective views of the drive gear of the adjuster of FIG. 1A.
Figure 13B:
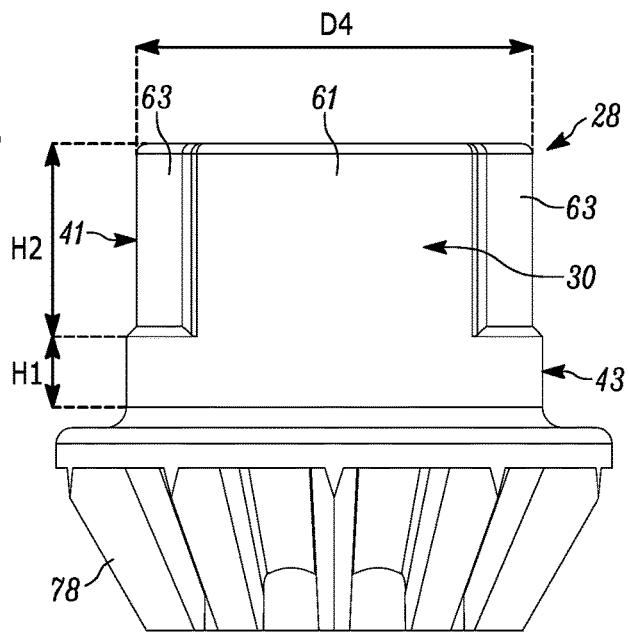
Figure 13C:
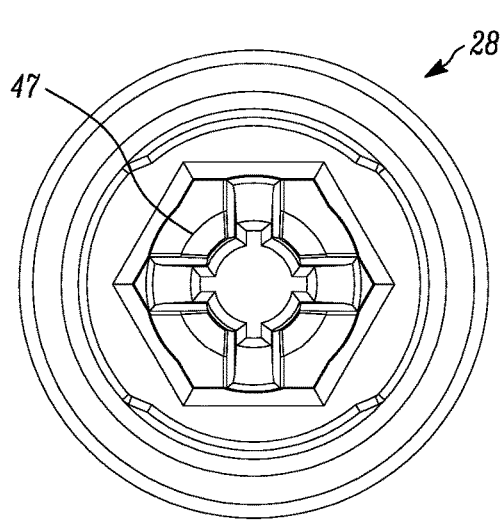
Figure 13D:
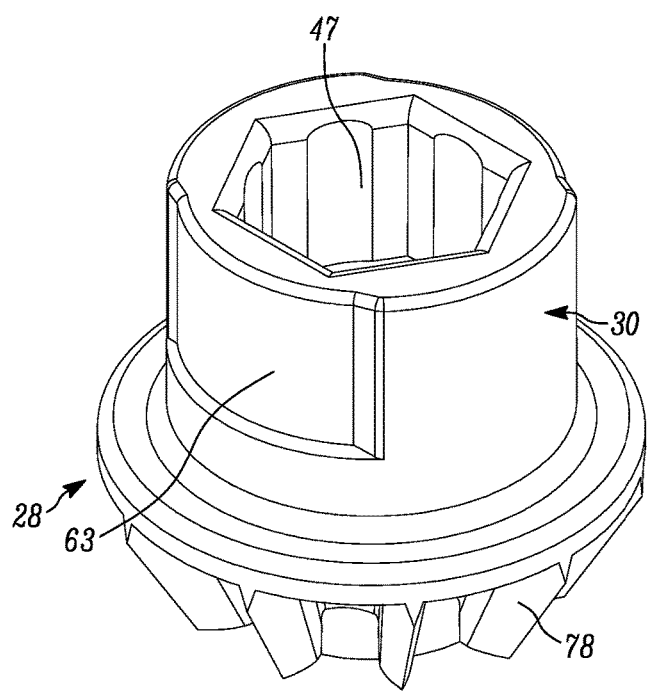
Figure 14:
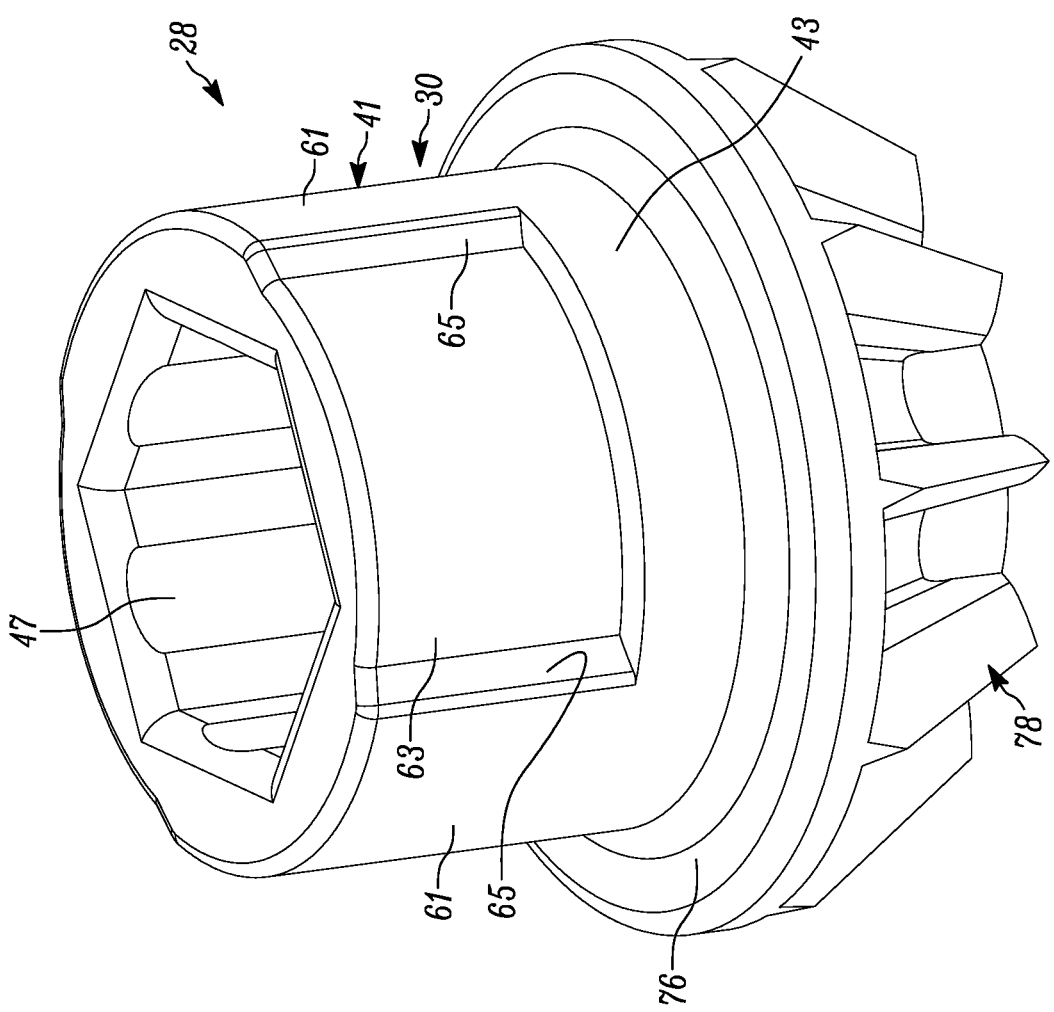
FIG. 14 is a top front perspective view of the drive gear of the adjuster of FIG. 1A.
Figure 15:
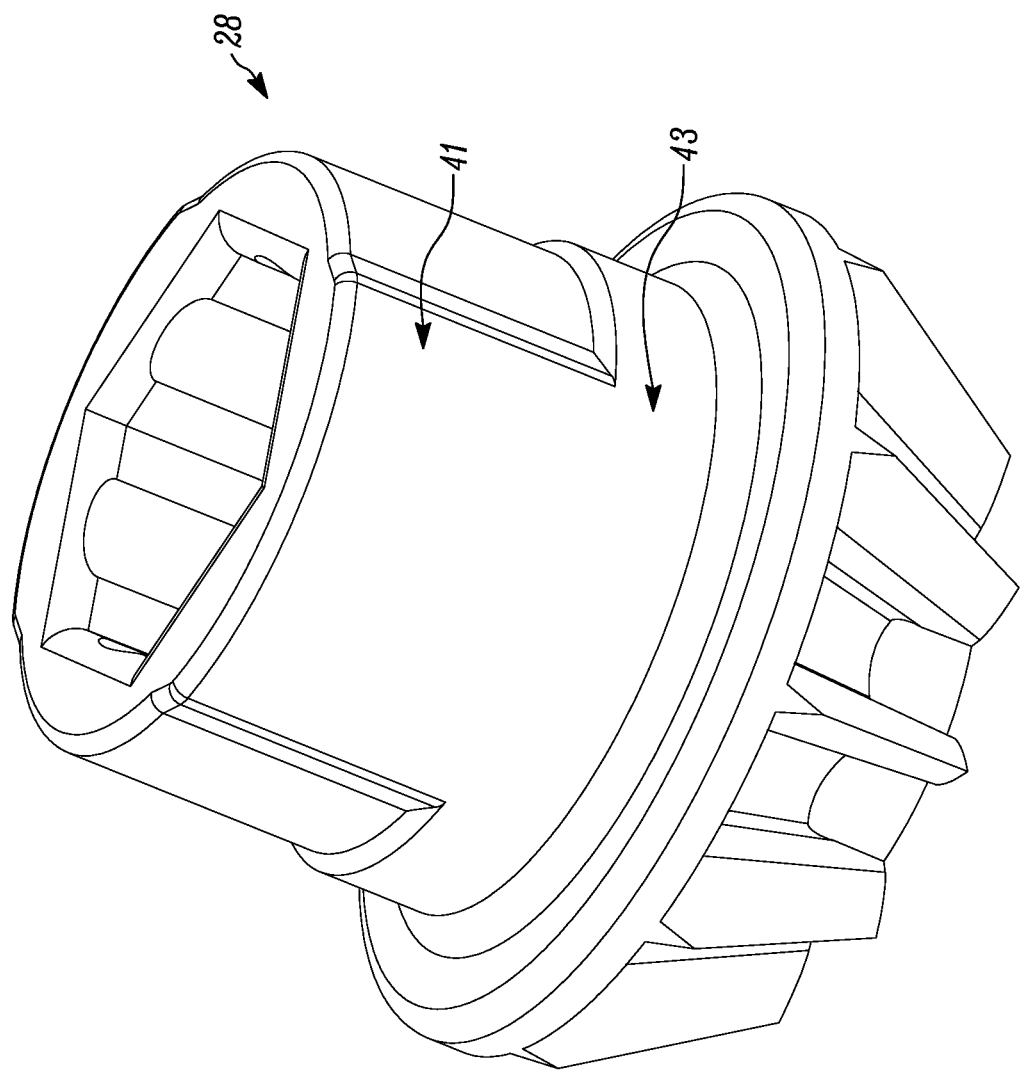
FIG. 15 is a top side perspective view of the drive gear of the adjuster of FIG. 1A.
Figure 16:
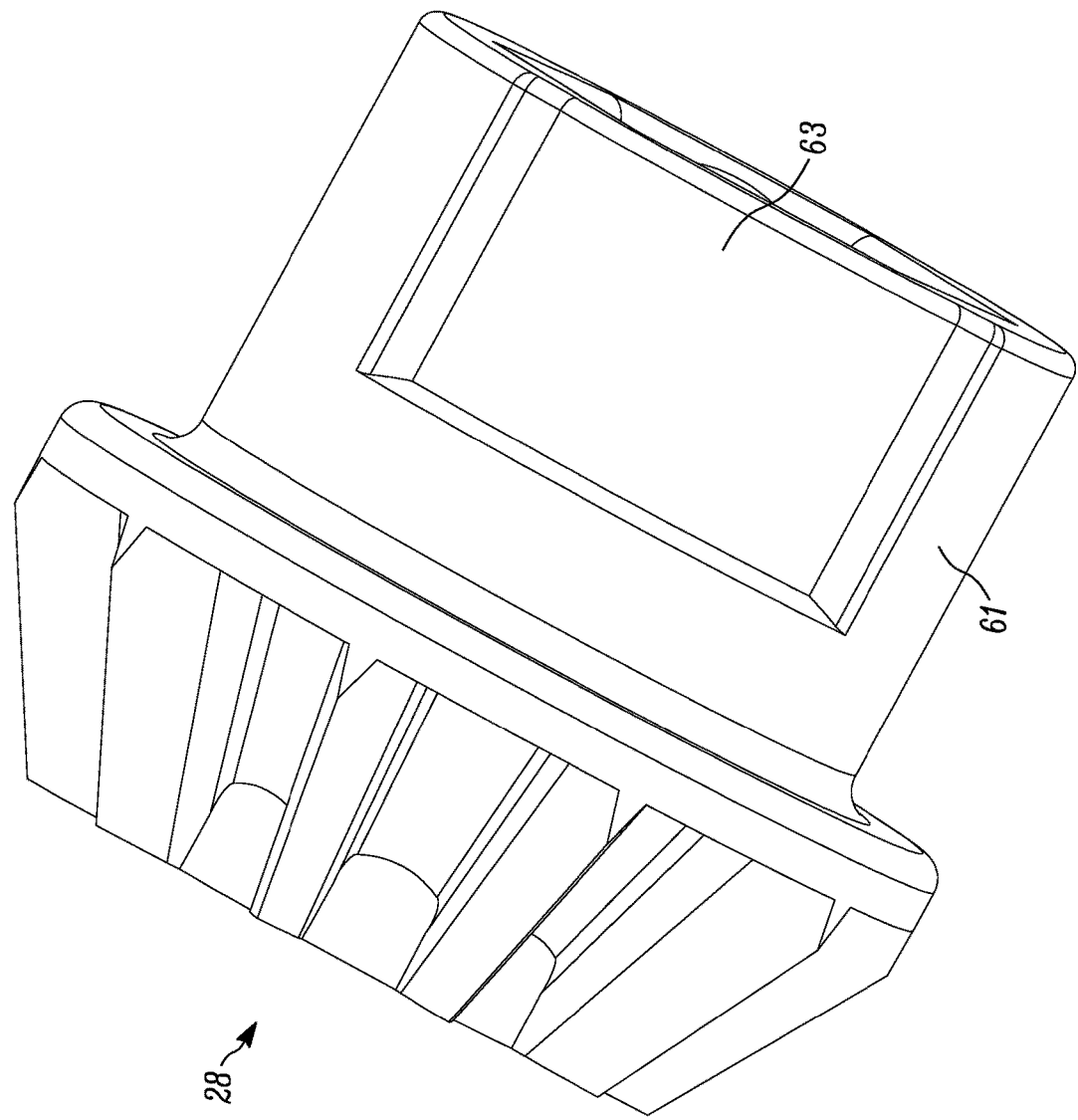
FIG. 16 is a front view of the drive gear of the adjuster of FIG. 1A.
Figure 17:
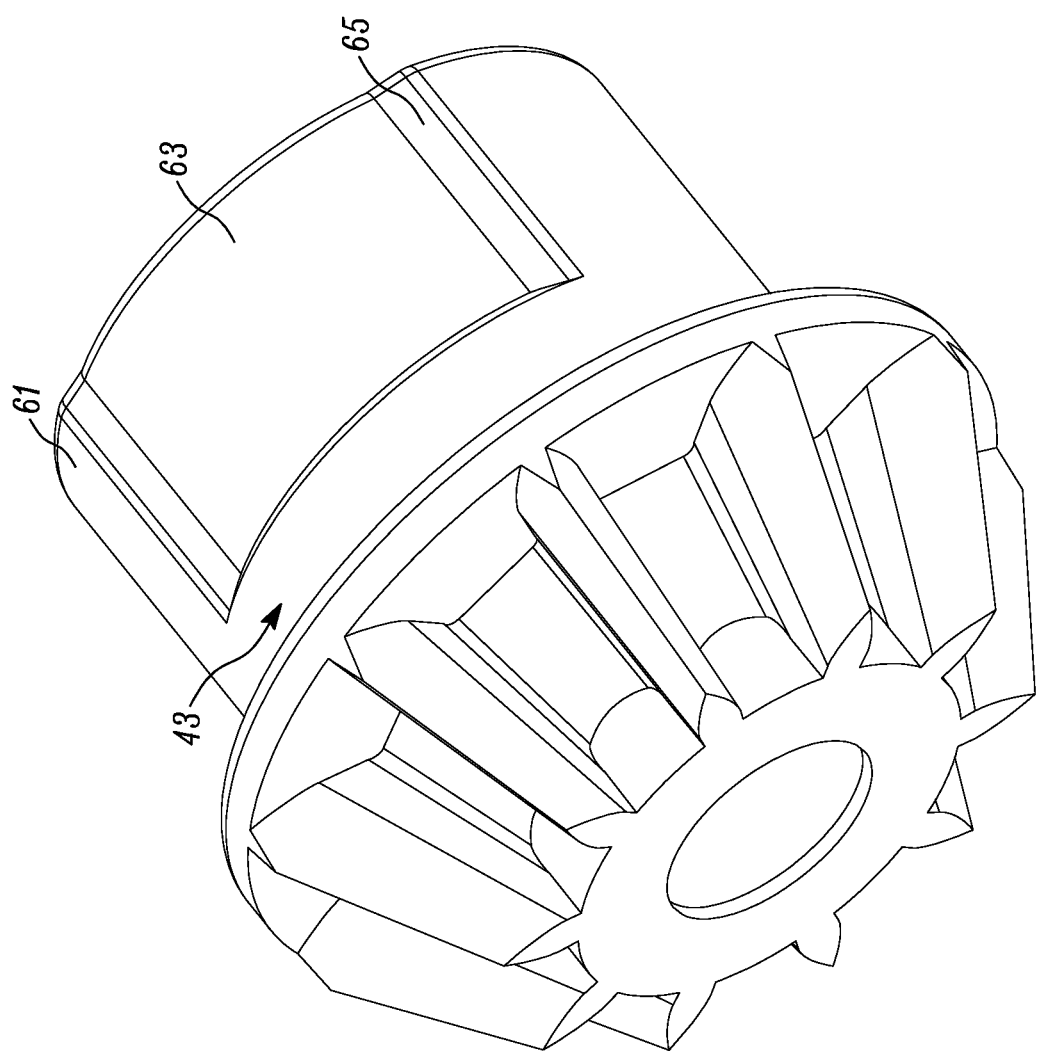
FIG. 17 is a bottom front perspective view of the drive gear of the adjuster of FIG. 1A.
Figure 18:
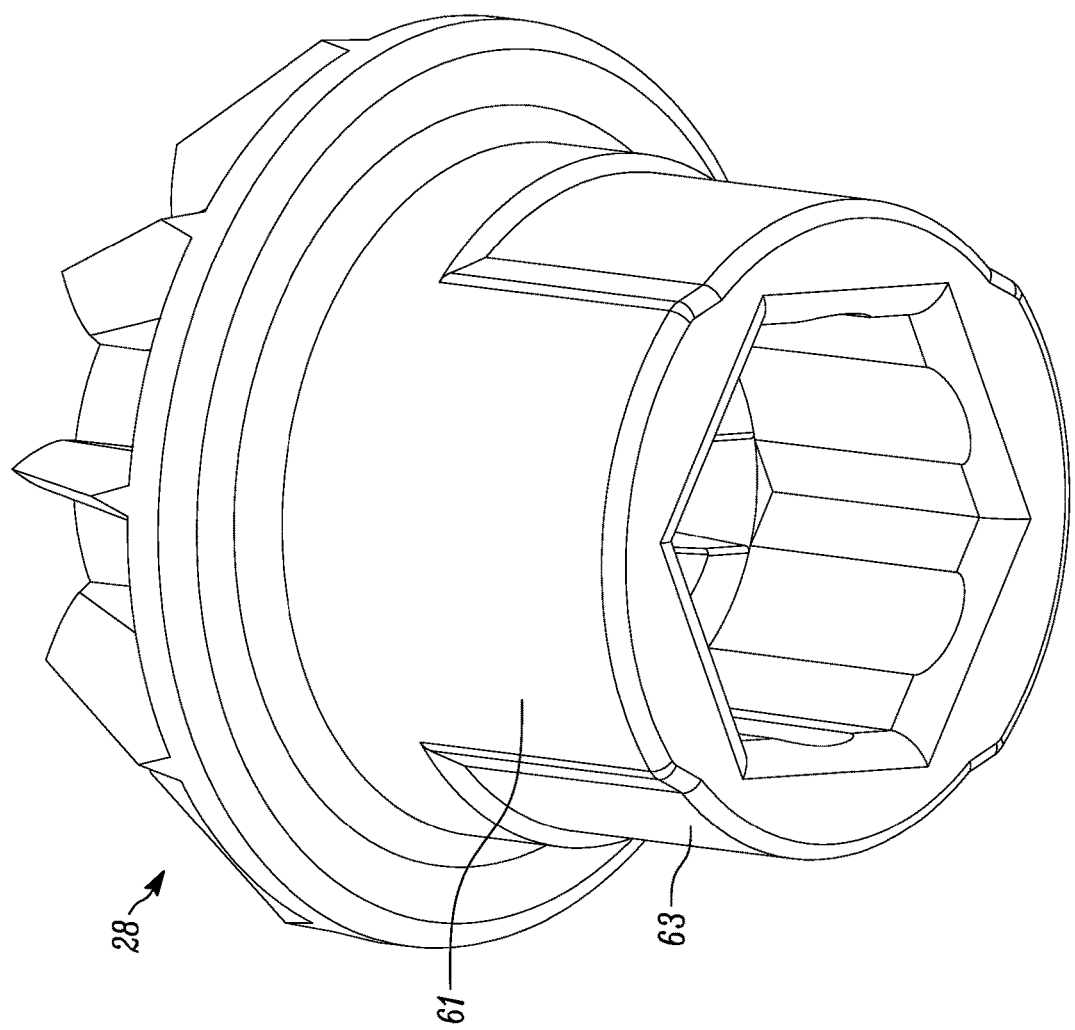
FIG. 18 is a top side perspective view of the drive gear of the adjuster of FIG. 1A.
Figure 19:
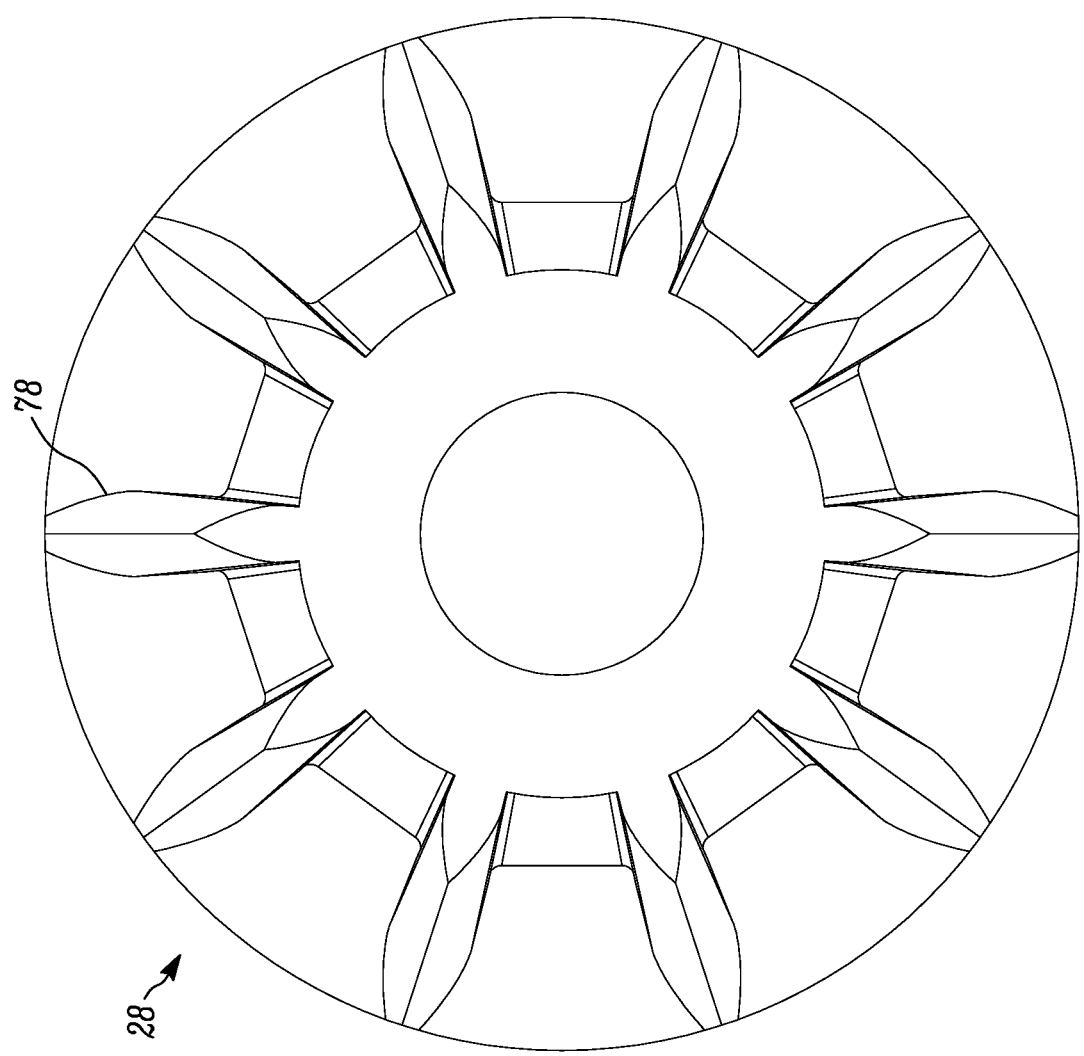
FIG. 19 is a bottom view of the drive gear of the adjuster of FIG. 1A.
Figure 20:
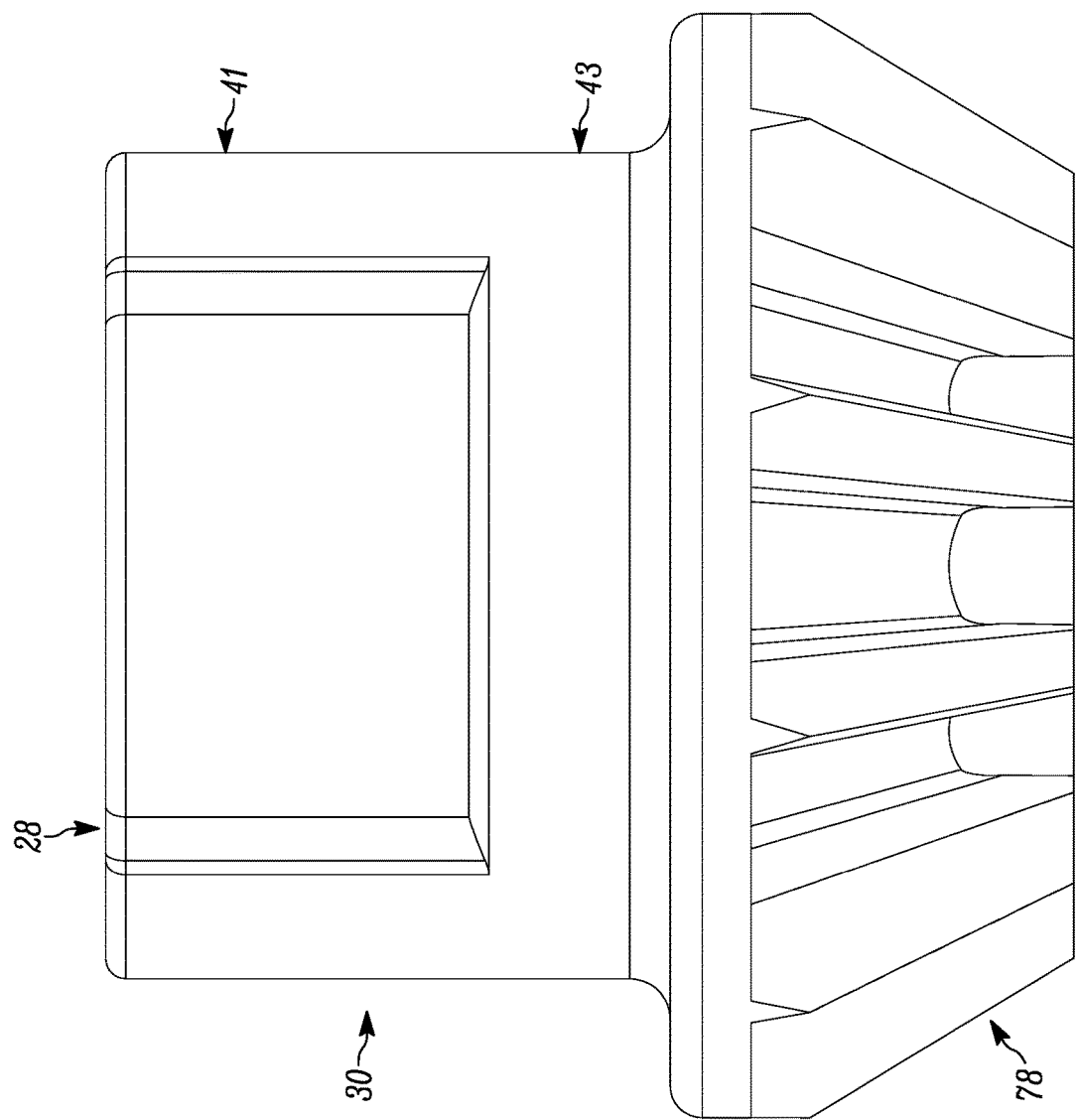
FIG. 20 is a front view of the drive gear of the adjuster of FIG. 1A.

As shown in at least FIGS. 1A-6, a headlamp adjuster (identified generally as 20) in accordance with one embodiment of the present invention, includes a gear housing 22 (detailed in FIGS. 7-12) having a neck 44, a drive gear 28 (detailed in FIGS. 13-20) with an integral input shaft 30, an internally threaded adjustment gear 34, and a threaded and splined adjustment shaft 36 ending in a ball stud 38. The drive gear 28 and the adjustment gear 34 intermesh inside the housing 22 such that rotation of the drive gear 28 causes rotation of the adjustment gear 34. Rotation of the adjustment gear 34 around the adjustment shaft 36 causes movement of the adjustment shaft 36 along its axis, as discussed below.

Referring at least to FIGS. 7-12, the neck 44 of the housing 22 includes a stepped interior wall 45 having a first wall portion 53 situated below a second wall portion 51, wherein in at least some embodiments, the second wall portion 51 is cylindrical and has an inner diameter D2 and the first wall portion 53 is cylindrical and has an inner diameter D1, wherein the diameter D2 is smaller than the diameter D1. A bottom ledge 74 is situated along the neck 44 adjacent the bottom of the interior wall 45 and in at least some embodiments, extends perpendicular to the first wall portion 53.

Referring at least to FIGS. 13A-20, an exemplary embodiment of the drive gear 28 is illustrated. The input shaft 30 of the drive gear 28 includes a shaft lower portion 43 having a height H1, a shaft upper portion 41 having a height H2, gear teeth 78 for engagement with the adjustment gear 34, and a gear ledge 76 over the gear teeth 78 that engages the bottom ledge 74 of the neck 44 to assist with maintaining the position of the drive gear 28 relative to the neck 44, wherein in at least some embodiments, the gear ledge 76 extends perpendicular to the input shaft 30.

Figure 21:
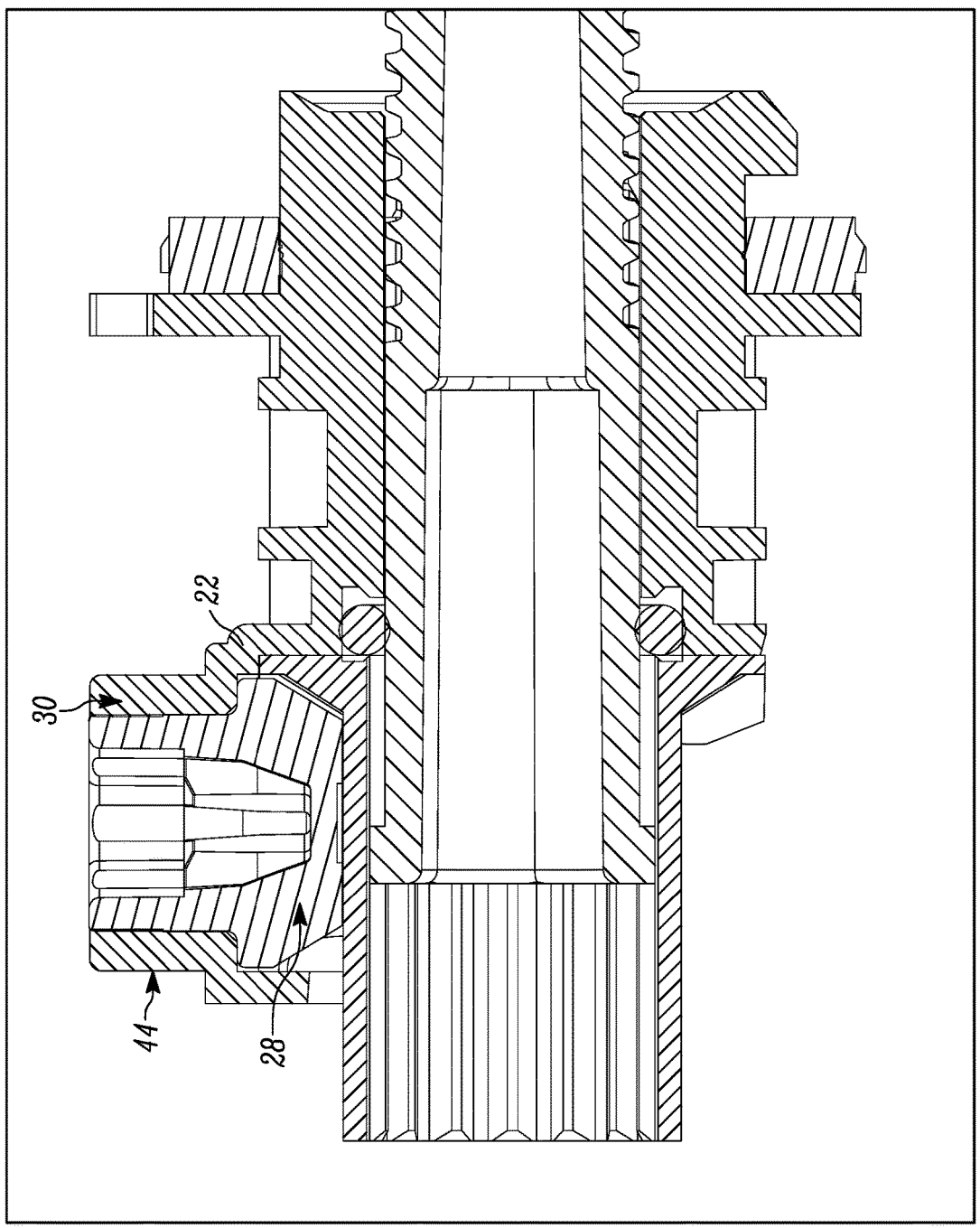
FIG. 21 is a detail side cross-sectional view of the adjuster of FIG. 6.
Figure 22:
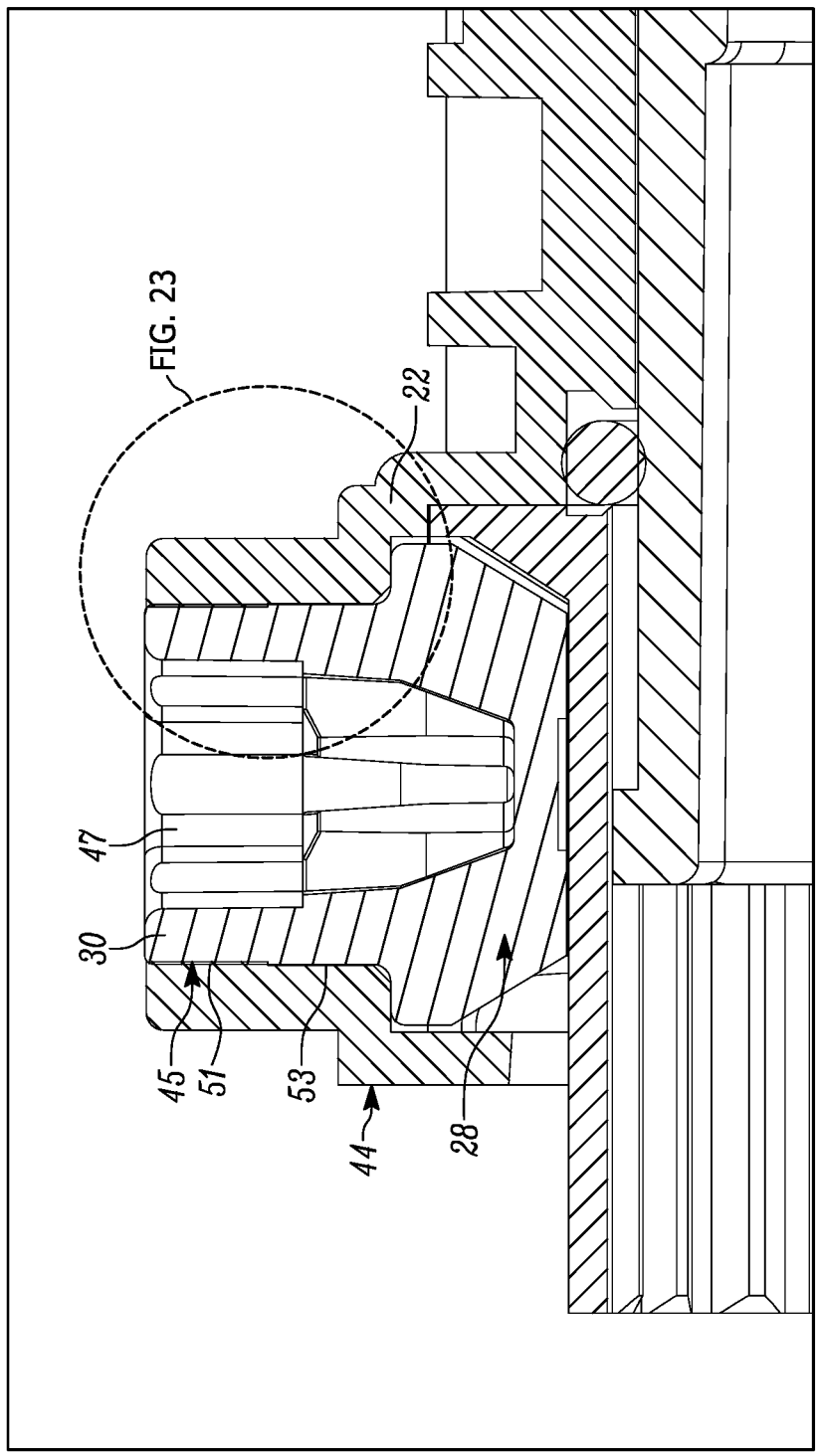
FIG. 22 is a detail side cross-sectional view of the adjuster of FIG. 21.
Figure 23:
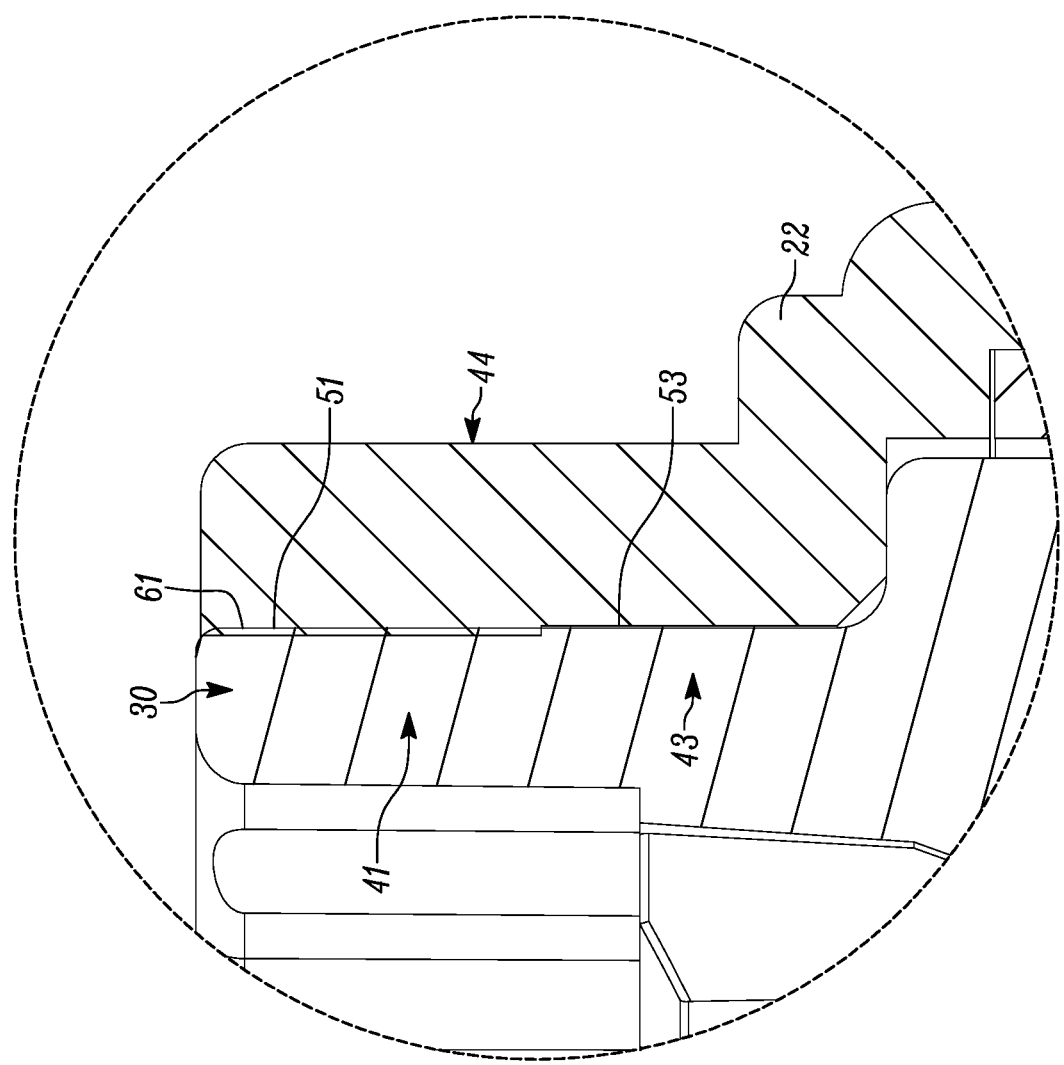
FIG. 23 is a detail side cross-sectional view of the adjuster of FIG. 22.
Figure 24:
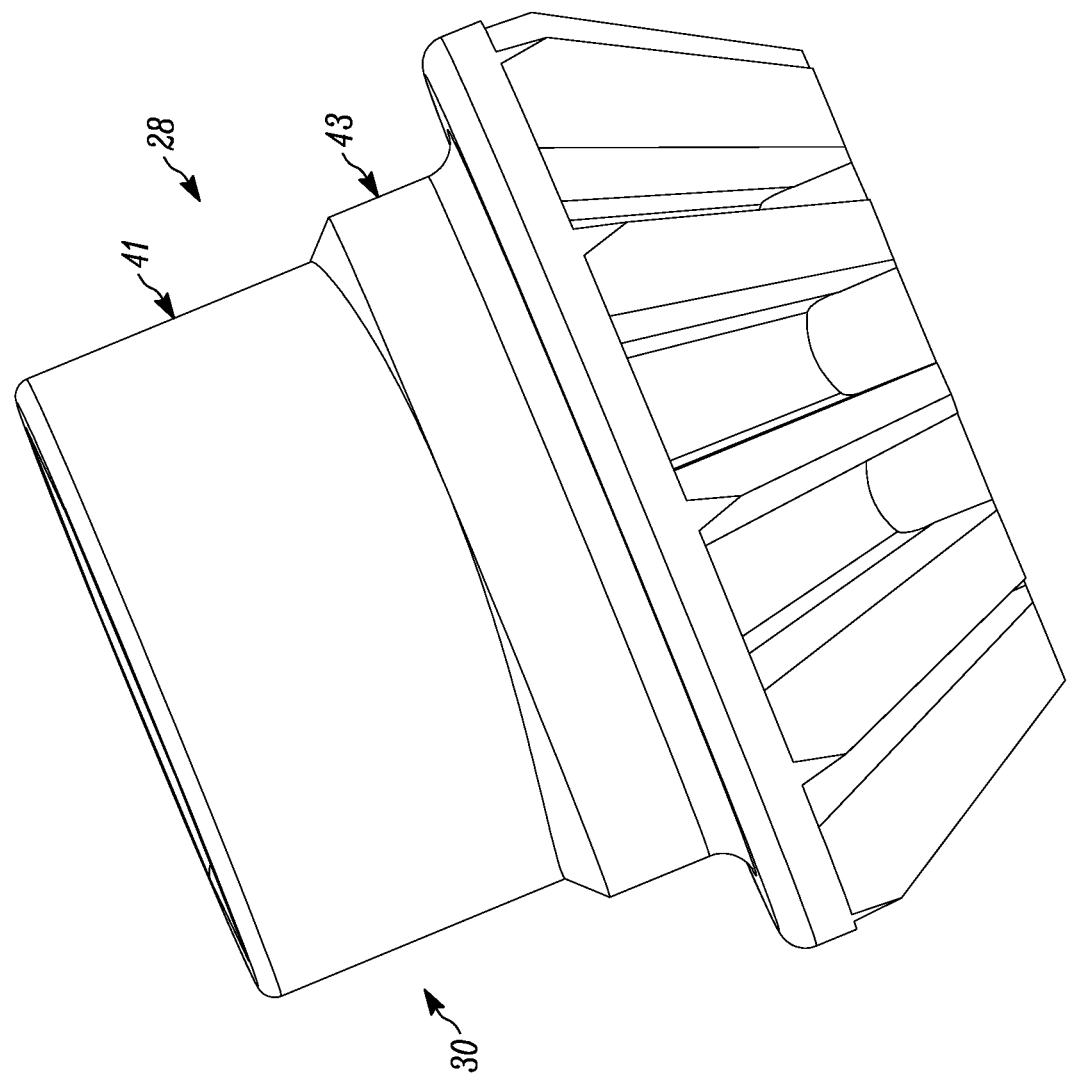
FIG. 24 is a side view of one alternative embodiment of a drive gear for use with a housing as shown in FIGS. 1-12.
Figure 25:
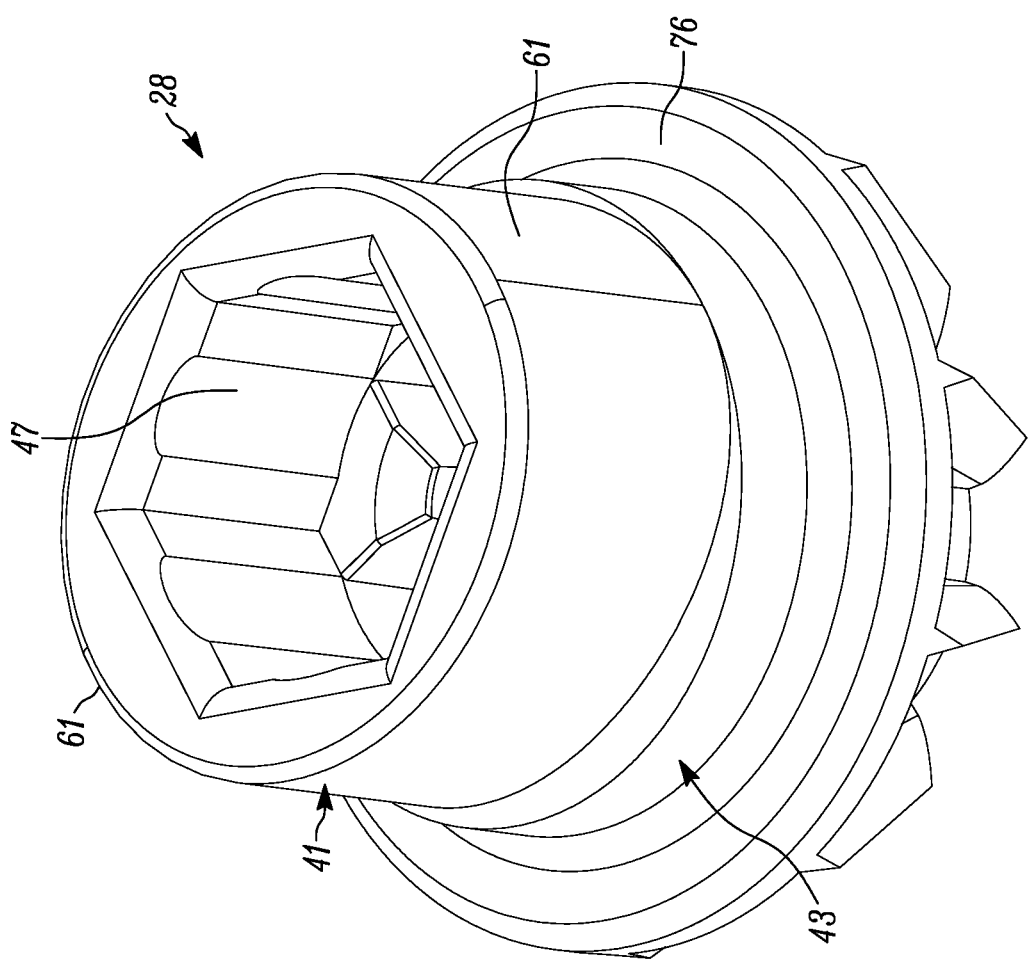
FIG. 25 is a top side perspective view of the alternative embodiment of a drive gear of FIG. 24.
Figure 26:
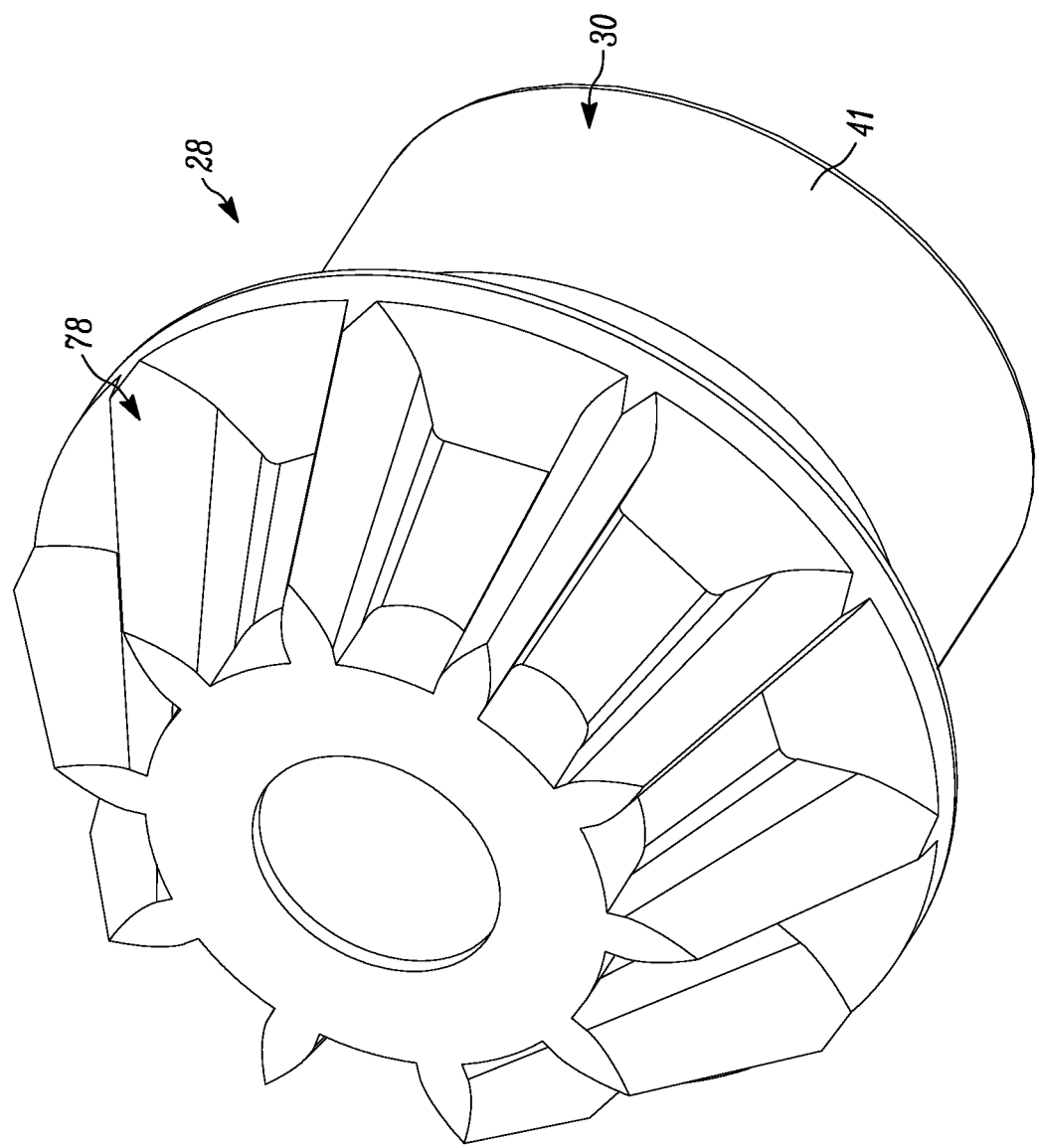
FIG. 26 is a bottom side perspective view of the alternative embodiment of a drive gear of FIG. 24.
Figure 27:
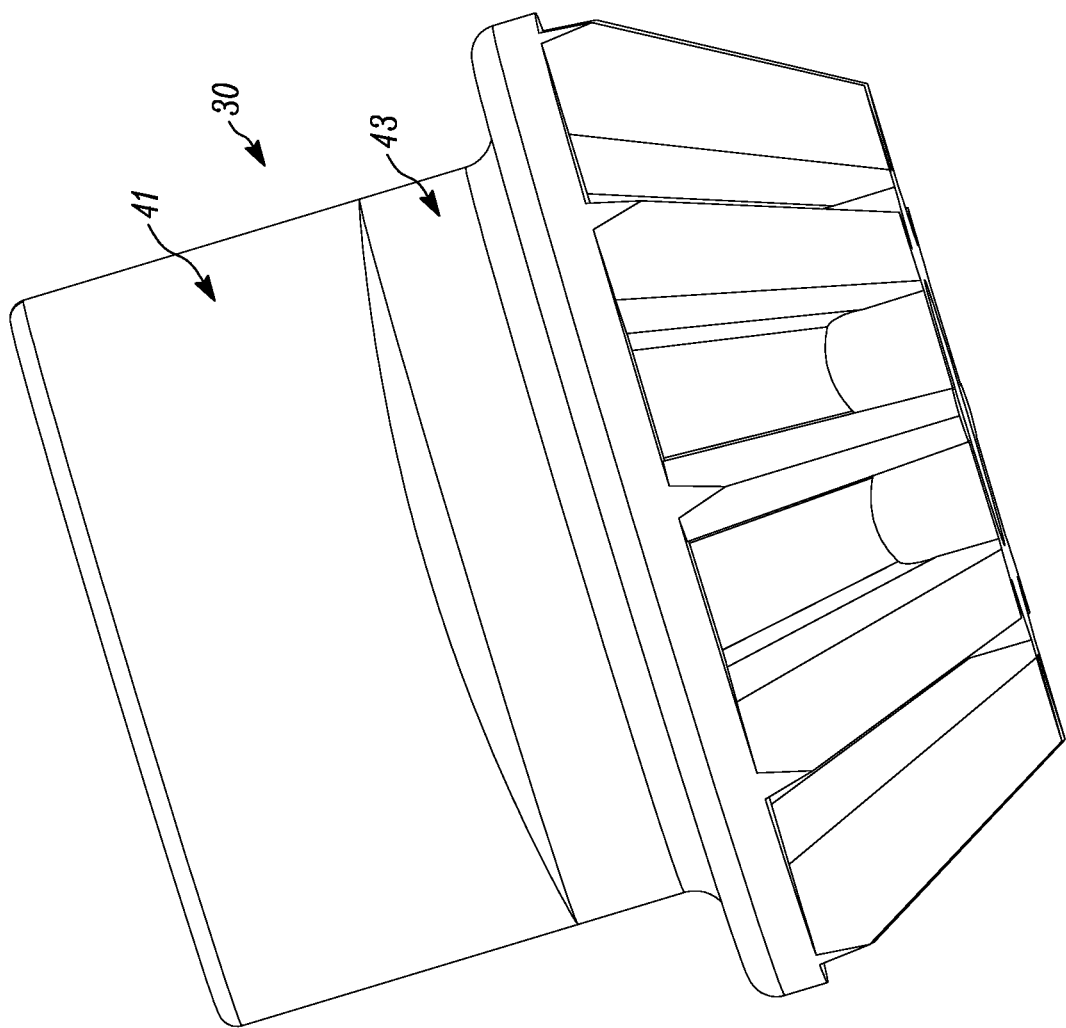
FIG. 27 is a front view of the alternative embodiment of a drive gear of FIG. 24.
Figure 28:
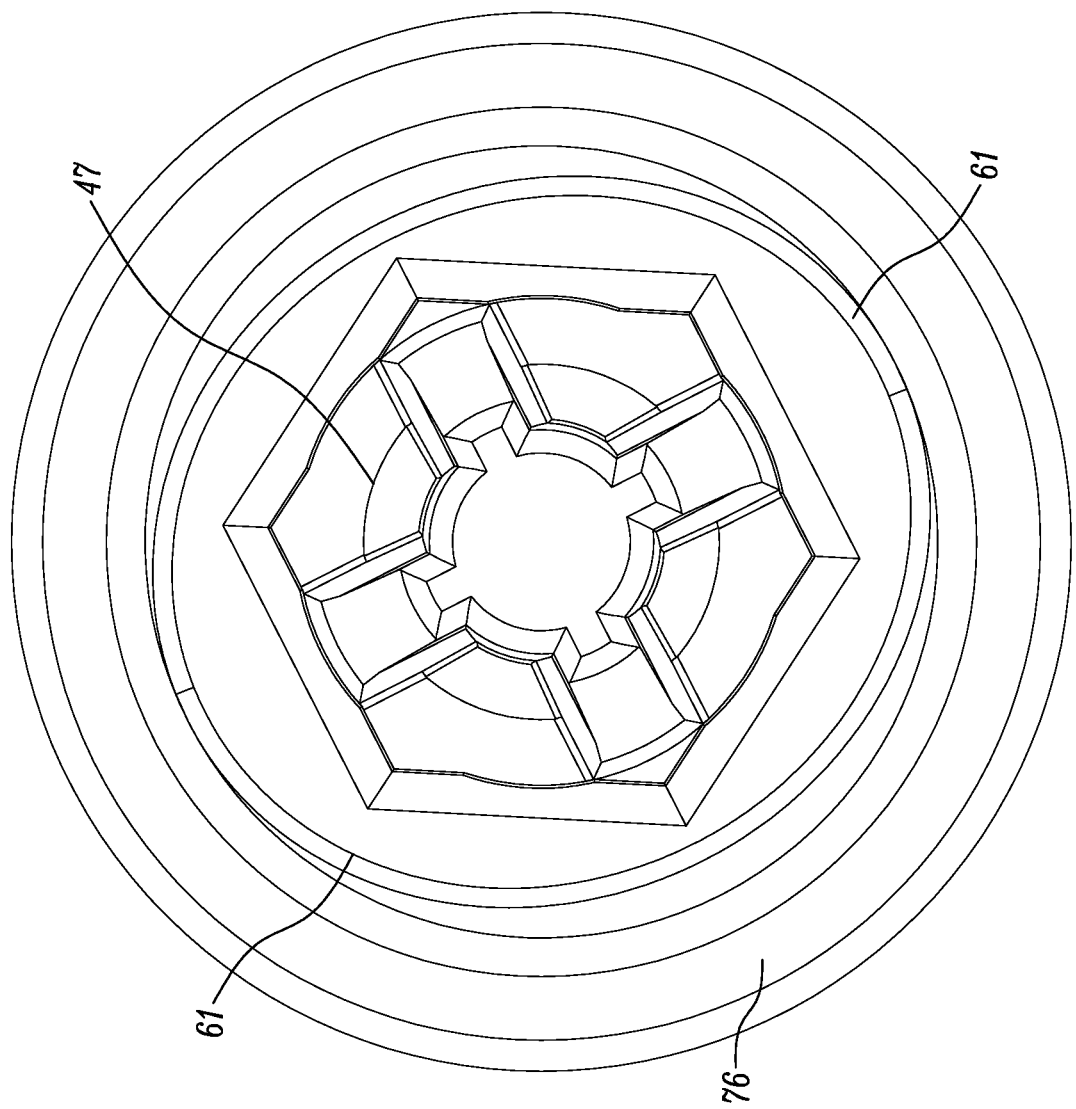
FIG. 28 is a top view of the alternative embodiment of a drive gear of FIG. 24.
Figure 29:
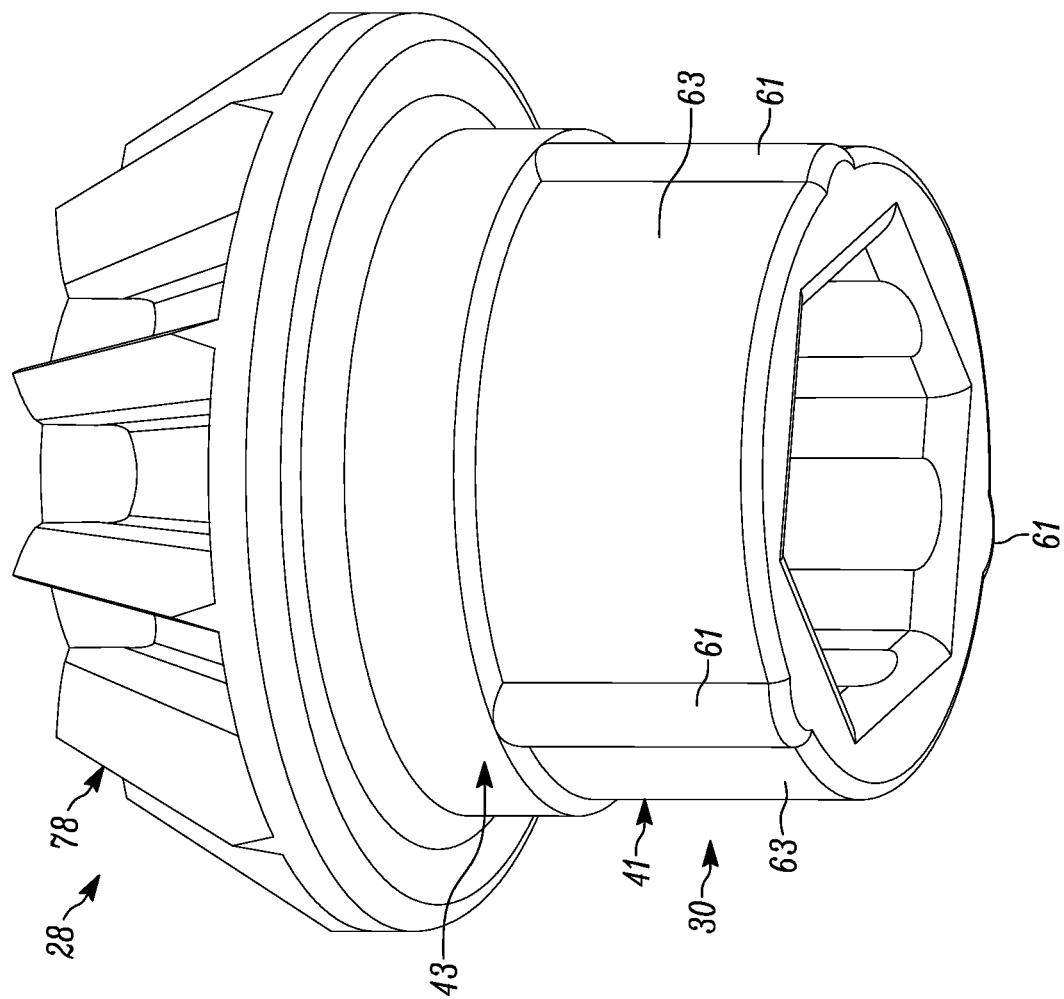
FIG. 29 is a side perspective view of an additional alternative embodiment of a drive gear for use with a housing as shown in FIGS. 1-12.
Figure 30:
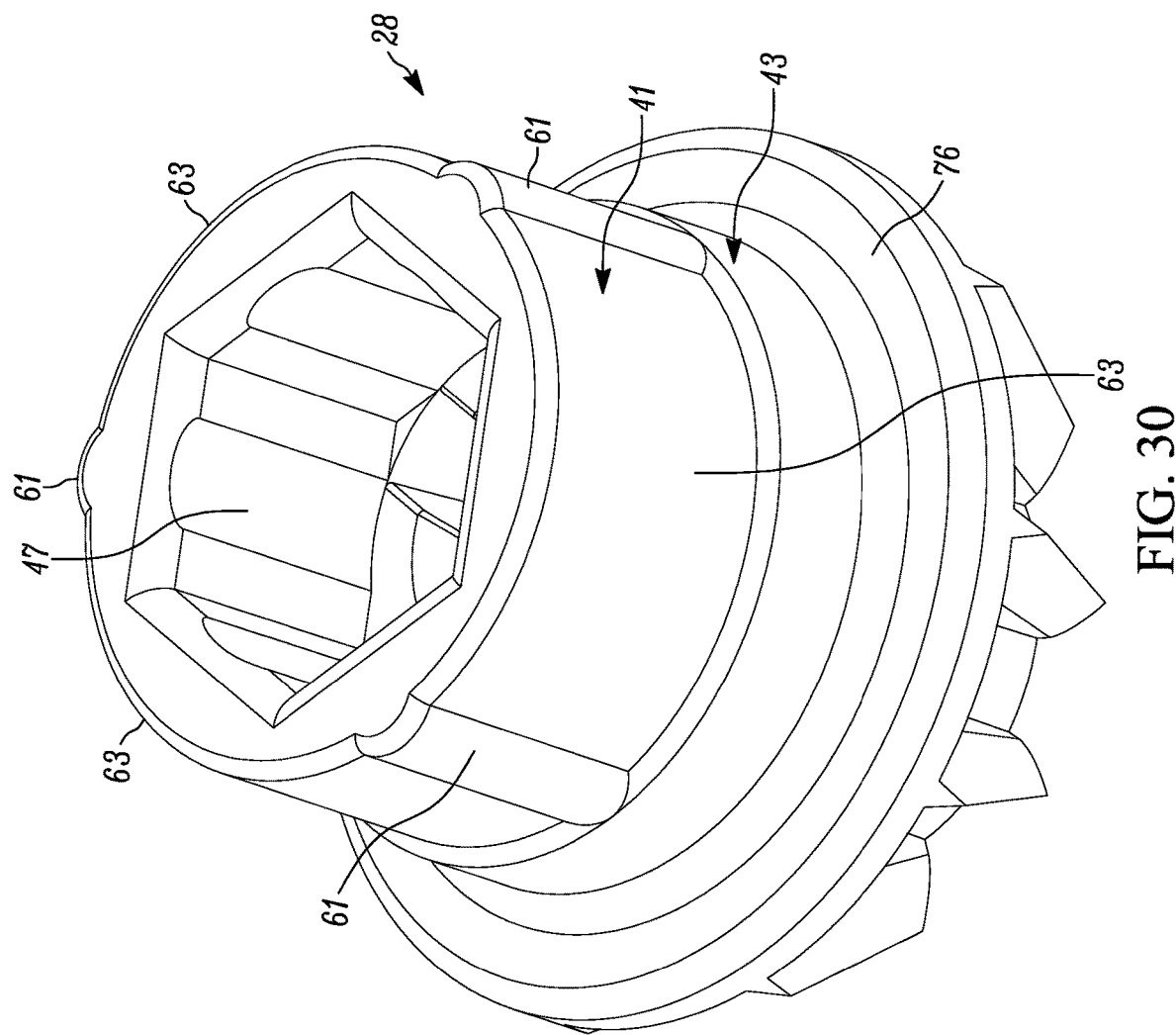
FIG. 30 is a top side perspective view of the additional alternative embodiment of a drive gear of FIG. 29.
Figure 31:
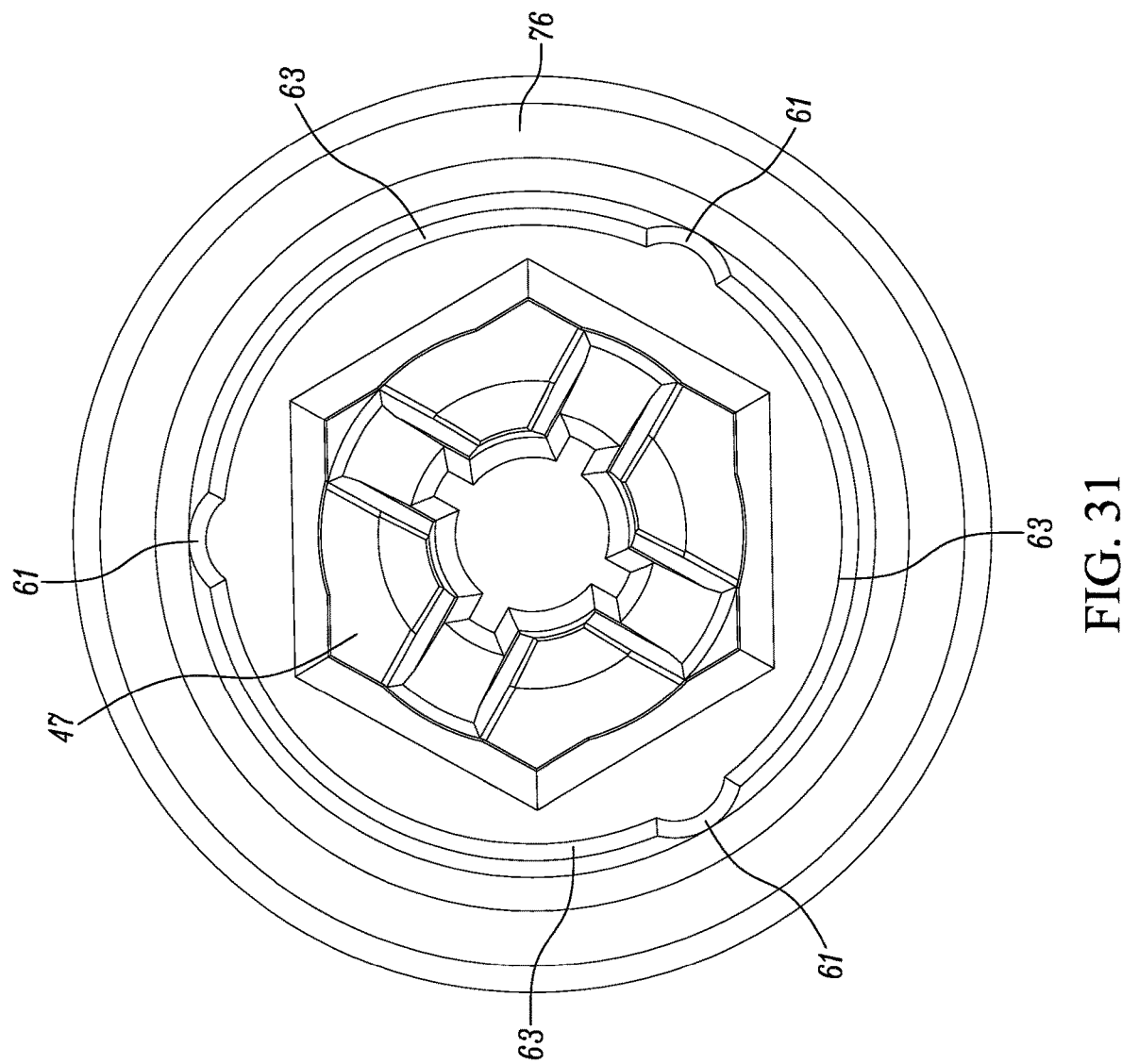
FIG. 31 is a top view of the additional alternative embodiment of a drive gear of FIG. 29.
Figure 32:
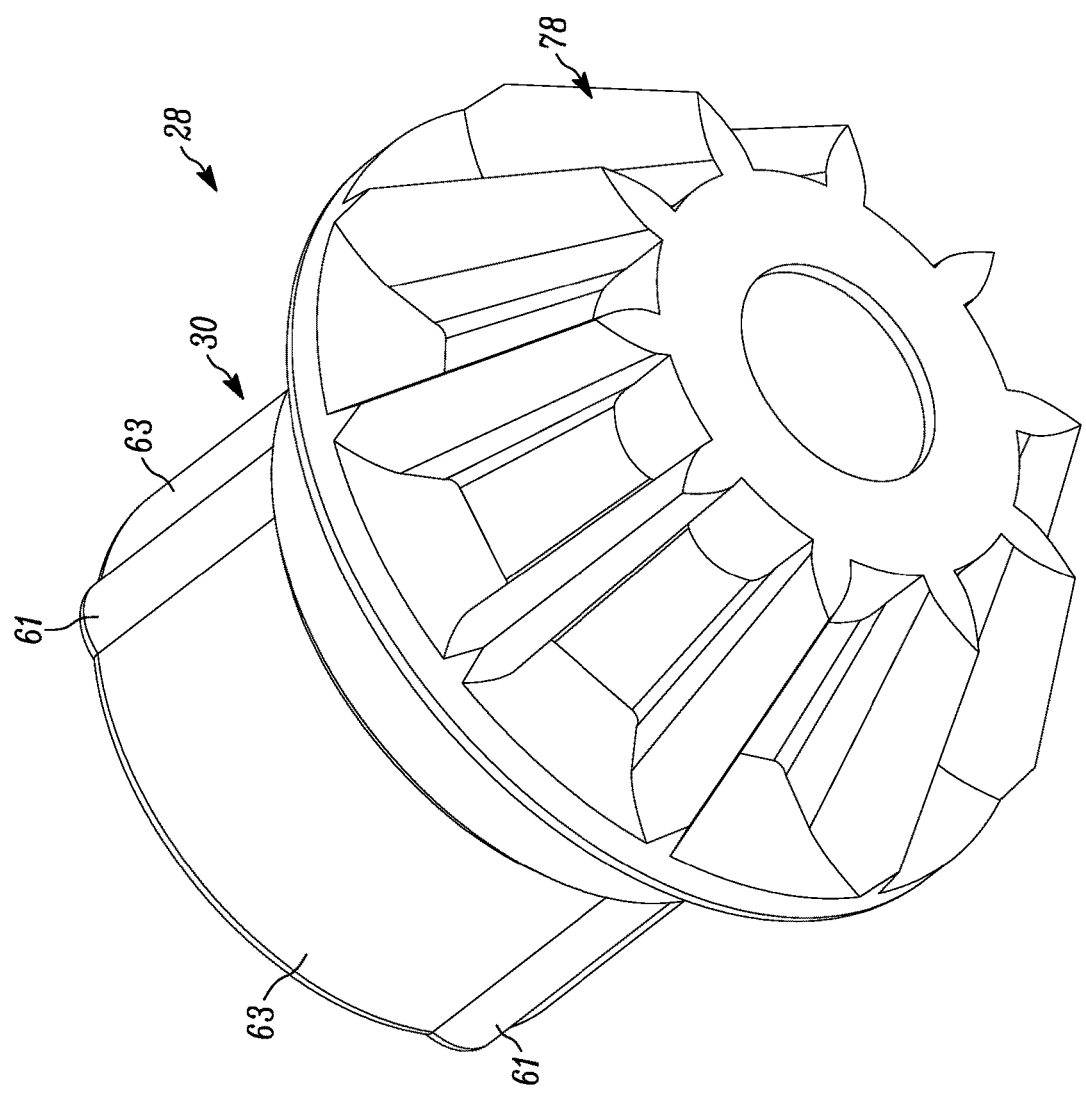
FIG. 32 is a bottom side perspective view of the additional embodiment of a drive gear of FIG. 29.

The shaft upper portion 41 of the input shaft 30 further comprises one or more lobes 61, which in at least some embodiments, extend between one or more recess walls 63, with a transition ramp portion 65 situated between the lobes 61 and the recess walls 63. Although FIGS. 13A-23 illustrate a first lobe and second lobe separated by recess walls 63, other embodiments of the drive gear 28 can include other lobe and recess wall configurations, such as less or more lobes 61 on the input shaft 30. For example, FIGS. 29-32 illustrate a drive gear 28 with three lobes 61, and FIGS. 24-28 illustrate a drive gear 28 having an oval (e.g., elliptical) shape creating two lobes without recess walls 63.

Referring at least to FIGS. 6 and 21-23, the adjuster 20 is shown with the drive gear 28 installed in the housing 22. As shown, the input shaft 30 of the drive gear 28 extends into the neck 44 of the housing 22 and can be rotated using a standard tool by a person adjusting the aim of an attached reflector/headlight. The input shaft 30 includes a tool engagement portion 47, which can have any number of conventional drive tool configurations such as hexagonal. Torx®, etc. The tool engagement portion 47 can include a recess in the input shaft 30 or be formed as part of a head atop the input shaft 30. Further, as seen in at least FIGS. 6, 22, and 23, the input shaft 30 is received in the neck 44 wherein the shaft lower portion 43 is dimensioned to rotationally engage the first wall portion 53 of the neck. As shown in at least FIGS. 13A-13D, with regard to the input shaft 30 of the drive gear 28, the shaft lower portion 43 is generally cylindrical and has an outer diameter D3. In at least some embodiments, the diameter D3 of the shaft lower portion 43 is marginally smaller than the diameter D1 of the first wall portion 53 of the neck to allow a fitted rotation therebetween without imparting undue stress on the first wall portion 53 of the neck 44, while in other embodiments, D3 can be of equal or substantially equal diameter to D3, providing a frictional force fitment, yet allow for rotation therebetween.

In at least some embodiments, the lobes 61 on the shaft upper portion 41 have the same outer diameter D3 extending therebetween (across the input shaft) as the shaft lower portion 43 as they extend along the input shaft 30, while the recess walls 63 are recessed inwards to provide an outer diameter D4 extending therebetween (across the input shaft) that is less than D3. In this manner, the difference in the diameters D3 and D4 establish the lobes 61 on the input shaft 30. As noted above, the second wall portion 51 of the neck 44 has an inner diameter D2 that is smaller than the diameter D1 of the first wall portion 53 (see FIG. 12). The diameter D3 is slightly larger than the diameter D2, thus creating a non-circular interference fit (see FIG. 23) that extends along the second wall portion 51. The diameter D2 is slightly greater than the diameter D4 to allow for reshaping of the neck, while minimizing overall stress on the neck 44. Due to the diameter D3 being larger than the diameter D2 at the lobes 61, the shaft upper portion 41 of the input shaft 30 is force fitted against the second wall portion 51 of the neck 44, causing a deformation of the neck 44, wherein the second wall portion 51 of the neck 44 is pushed outwards where the lobes 61 contact the second wall portion 51, and the second wall portion 51 of the neck 44 bends inward adjacent the recess walls 63. In this manner the neck 44 is reshaped from a circular shape into an oval (e.g., elliptical) shape. Thus, the friction fit between the second wall portion 51 of the neck 44 and the shaft upper portion 41 of the input shaft 30 creates a rotation resistance which retains the adjuster 20 in adjustment when the vehicle is bumped or jostled.

Although the lobes 61 put some stress on the neck 44 by pushing outward against the original circular shape, much of the stress is relieved by the inward deflection of the neck 44 adjacent the recess walls 63, thereby limiting the overall radial expansion force on the neck 44. In contrast, if the diameter D3 of the shaft upper portion 41 was uniform (no lobes), the neck 44 would be forced to expand (in contrast to reshaping) through a forced fit of the shaft upper portion 41 into the smaller diameter second wall portion 51, which can limit the structural integrity of the neck 44 during installation and over time of use. The reshaping of the neck 44 and engagement with the input shaft 30, provides a resistance to rotation of the drive gear 28 at the input shaft 30, as the recess walls 63 are wedged by the inward deflecting portions of the second wall portion 51 and the lobes 61 are force fit against the outward deflected portions of the second wall portion 51. This configuration can thereby retain the adjuster 20 in adjustment when the vehicle is bumped or jostled, without creating an undue expansion force on the neck 44.

In addition, the diameter D2 of the second wall portion 51 of the neck 44, the diameter, shape, size, and quantity of the lobes 61, and the thickness and elasticity of the neck 44 can all be adjusted to either increase or decrease the rotation resistance and rotational securement as desired for a particular application. As flexing of the second wall portion 51 is desirable to reshape the neck 44, the use of less rigid material compositions are permissible, which in turn contributes to longevity and resistance to fracture as a result of vehicle road impact and/or hot and cold temperatures. Reshaping the neck 44 allows for easier installation of the drive gear 28 into the housing 22 and less incidences of damage during installation as well as during adjustment procedures.

Referring to FIGS. 24-28, an alternate embodiment of the drive gear 28 is illustrated. As shown, the shaft upper portion 41 includes a pair of opposing lobes 61 formed by shaping the shaft upper portion 41 into an oval (e.g., elliptical) shape, thereby negating the need for separately formed recess walls 63 between the lobes 61, noting that the lobes in the first embodiment were created from a circular shaft upper portion 41 using recess walls 63, as opposed to an oval (e.g., elliptical) shape shaft upper portion 41.

FIGS. 29-32 illustrate another alternate embodiment of the drive gear 28, which includes three lobes 61 with three recess walls 63 therebetween. Similar to the first embodiment, these alternate embodiments reshape the neck 44 into a full or partial oval (e.g., elliptical) shape using the lobes 61 to provide a rotational resistance relative to the neck 44. These alternate embodiments can be used interchangeability with the housing 22 without the need for further modification. Although the lobes 61 of the embodiment in FIGS. 29-32 are not situated diametrically across from each other, in combination, the lobes 61 create a circumference that is greater than that at the second wall portion 51 of the neck 44, such that the input shaft 30 is force fit into the neck 44 and the abutment of the lobes 61 against the second wall portion 51 force the neck to be reshaped to deflect outward at the lobes 61 and inward at the recess walls 63. As with all embodiments of the drive gear 28 and neck 44, the shaft upper portion 41 and shaft lower portion 43, as well as the second wall portion 51 and first wall portion 53, can each be extended or reduced in height to provide more or less frictional engagement. In at least some embodiments, the configuration of the shaft upper portion 41 can be extended to eliminate the shaft lower portion 43, and similarly, the second wall portion 51 can be extended to eliminate the first wall portion 53.

In at least some embodiments, the housing 22 in which the drive gear 28 and adjustment gear 34 intermesh is an open chamber situated below the neck 44. Various alternate housing configurations are described in detail in the incorporated Burton patents and others are possible. It is to be understood that the drive gear 28 embodiments can be utilized with the housing 22 described herein as well as various other housing styles and adjusters. Additionally, a gasket 56 may be provided on the exterior of the housing 22 to ensure a sealed fit of the adjuster 20 to the headlamp assembly.

Further referring to at least FIGS. 1B, 1C, 6, and 7, during regular adjusting operation of the adjuster 20, rotation of the input shaft 30 results in rotation of the connected drive gear 28. The drive gear 28 is intermeshed with the adjustment gear 34 which thus rotates a splined portion 54 of the bore 52 in the adjustment gear 34, which engages splines 64 that extend circumferentially around the adjustment shaft 36 and rotates the adjustment shaft 36. Rotation of the adjustment shaft 36 causes helical movement of the threads 40 with respect to one or more helical thread segments 66 situated circumferentially around a housing nose 68, and results in the adjustment shaft 36 traversing longitudinally through the housing 22, with the adjustment shaft 36 moving along its axis 70 in the direction indicated by arrow 72 in FIG. 6. This movement of the adjustment shaft 36 causes displacement and adjustment of a reflector or headlamp/assembly connected to the adjustment shaft 36 at the ball stud 38.

Assembly of the headlamp adjuster 20 is straightforward. First, the input shaft 30 is inserted through the neck 44 of the housing 22 such that the input shaft 30 is fitted within the neck 44 and the adjustment gear 34 extends within the body 24. The adjustment gear 34 is then placed in the body 24 such that it intermeshes with the drive gear 28. The adjustment shaft 36 is threaded through the nose 68 via the thread segments 66.

While the present invention is particularly useful in automotive headlamp assemblies, other applications are possible and references to use in a headlamp assembly should not be deemed to limit the application of the present invention. Additionally, while the lobe input shaft reshaping feature works well with the particular headlamp adjuster shown, it may also be used in other threaded adjustment devices where rotational securement to maintain adjustment is desired. The present invention may be advantageously adapted for use where similar performance capabilities and characteristics are desired. These and other objects and advantages of the present invention will become apparent from the detailed description, claims, and accompanying drawings.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter.

What is claimed is:

1. An adjuster mechanism comprising:
a housing having a neck;
an adjustment gear at least partially journaled within the housing;
an adjustment shaft passing at least partially through the adjustment gear and extending from the housing;
a drive gear positioned at least partially within the housing, the drive gear rotatable to cause rotation of the adjustment gear and axial movement of the adjustment shaft, wherein the drive gear has an input shaft extending through the neck of the housing; and
at least one lobe situated on the input shaft of the drive gear, wherein the at least one lobe provides a non-circular interference fit with the housing that establishes a resistance to rotation of the drive gear sufficient to retain the adjustment shaft in a desired adjustment.

2. The adjuster mechanism of claim 1, wherein axial movement of the adjustment shaft upon rotation of the adjustment gear is caused by engagement between a splined interior portion of the adjustment gear and a splined exterior portion of the adjustment shaft, the adjustment shaft rotating during axial movement such that a threaded portion thereof threadingly interacts with the gear housing.

3. The adjuster mechanism of claim 1, wherein rotation of the input shaft of the drive gear causes a reshaping of the neck of the housing as the at least one lobe situated on the input shaft is rotated within the neck.

4. The adjuster mechanism of claim 1, wherein the at least one lobe further includes at least a first lobe and a second lobe, and wherein the first lobe is positioned opposite the second lobe on the input shaft.

5. The adjuster mechanism of claim 1, wherein the input shaft further includes recess walls positioned between the lobes.

6. The adjuster mechanism of claim 1, wherein the input shaft further includes a shaft upper portion and a shaft lower portion.

7. The adjuster mechanism of claim 6, wherein shaft upper portion has an oval circumference and the shaft lower portion has a circular circumference.

8. The adjuster mechanism of claim 7, wherein the at least one lobe further includes a first lobe and a second lobe, and wherein the first lobe is positioned opposite the second lobe on the input shaft.

9. The adjuster mechanism of claim 8, wherein the first lobe and the second lobe are positioned on the shaft upper portion.

10. The adjuster mechanism of claim 6, wherein the at least one lobe further includes a first lobe, a second lobe, and a third lobe, evenly spaced along the shaft upper portion.

* * * * *